US012250538B2

(12) United States Patent
Henry et al.

(10) Patent No.: US 12,250,538 B2
(45) Date of Patent: *Mar. 11, 2025

(54) ENCRYPTED NONCES AS ROTATED DEVICE ADDRESSES

(71) Applicant: Cisco Technology, Inc., San Jose, CA (US)

(72) Inventors: Jerome Henry, Pittsboro, NC (US); Stephen Michael Orr, Wallkill, NY (US); Robert E. Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,285

(22) Filed: Nov. 27, 2023

(65) Prior Publication Data

US 2024/0089731 A1    Mar. 14, 2024

Related U.S. Application Data

(63) Continuation of application No. 17/333,463, filed on May 28, 2021, now Pat. No. 11,902,775.

(51) Int. Cl.
*H04W 12/0431* (2021.01)
*H04W 12/03* (2021.01)
(Continued)

(52) U.S. Cl.
CPC ....... *H04W 12/0431* (2021.01); *H04W 12/03* (2021.01); *H04W 12/06* (2013.01); *H04W 12/73* (2021.01)

(58) Field of Classification Search
CPC ....... H04W 12/06; H04W 8/26; H04W 12/08; H04W 12/75; H04W 12/71;
(Continued)

(56) References Cited

U.S. PATENT DOCUMENTS 6,823,454 B1 * 11/2004 Hind ................... H04L 61/4511
                                                    713/168
7,480,939 B1 *  1/2009 Nessett ................ H04L 9/083
                                                    713/168
(Continued)

FOREIGN PATENT DOCUMENTS

| CN | 107690138 A | 2/2018 |
| WO | 2015104629 A1 | 7/2015 |
| WO | 2017026930 A1 | 2/2017 |

OTHER PUBLICATIONS

Ansley, C., et al., "Proposed Text for ID Query Action Frame," IEEE P802.11, Wireless LANs, 11-19-0496-01-000m11-19-0496-01-000m, Jul. 2019, pp. 1-4.

(Continued)

*Primary Examiner* — Lizbeth Torres-Diaz
(74) *Attorney, Agent, or Firm* — Edell, Shapiro & Finnan, LLC

(57) ABSTRACT

Rotation of a wireless client device address is based on an encryption key and a nonce value. Key information and nonce value information are shared between a wireless client device and a network infrastructure component over a secure communication channel. The wireless client device encrypts the nonce value using the key information and encodes the encrypted value as a device address. The wireless client device then identifies itself via a source address value in a message transmitted over a wireless network. Upon receiving the message, the network infrastructure component decrypts information derived from the source address value and compares the resulting data to the nonce value. If a match is identified, the network infrastructure identifies the wireless client device as a source of the message. In some embodiments, the nonce value is updated with each rotation to provide for improved entropy of generated device addresses.

20 Claims, 13 Drawing Sheets

(51) Int. Cl.
*H04W 12/06* (2021.01)
*H04W 12/73* (2021.01)

(58) Field of Classification Search
CPC ............ H04W 12/0431; H04W 12/73; H04W 12/03; H04L 63/0876; H04L 61/5046; H04L 61/5092; H04L 63/0407; G06F 21/44

See application file for complete search history.

(56) References Cited

U.S. PATENT DOCUMENTS

| | | | | |
|---|---|---|---|---|
| 7,512,796 | B2* | 3/2009 | Haverinen | H04W 12/06 |
| | | | | 455/433 |
| 7,522,731 | B2* | 4/2009 | Klemba | H04W 52/46 |
| | | | | 713/163 |
| 8,429,393 | B1* | 4/2013 | Anderson | G06F 21/73 |
| | | | | 713/168 |
| 8,644,510 | B2* | 2/2014 | Cakulev | H04L 63/0442 |
| | | | | 380/255 |
| 8,700,894 | B2* | 4/2014 | Hammell | H04L 9/3252 |
| | | | | 380/278 |
| 8,850,216 | B1* | 9/2014 | Mikhailov | H04L 9/3271 |
| | | | | 713/185 |
| 8,850,545 | B2* | 9/2014 | Cha | H04L 9/3271 |
| | | | | 726/8 |
| 10,034,135 | B1* | 7/2018 | Provost | H04W 12/033 |
| 10,985,915 | B2* | 4/2021 | McCann | H04L 63/162 |
| 11,128,661 | B2* | 9/2021 | Li | H04W 12/71 |
| 11,700,527 | B2* | 7/2023 | Gundavelli | H04W 8/265 |
| | | | | 455/411 |
| 2002/0194501 | A1* | 12/2002 | Wenocur | H04L 67/55 |
| | | | | 726/4 |
| 2009/0024848 | A1* | 1/2009 | Takasugi | H04L 9/3273 |
| | | | | 713/169 |
| 2013/0086642 | A1* | 4/2013 | Resch | H04L 9/321 |
| | | | | 726/4 |
| 2014/0282972 | A1* | 9/2014 | Fan | H04L 63/0815 |
| | | | | 726/7 |
| 2015/0040195 | A1* | 2/2015 | Park | H04W 12/062 |
| | | | | 726/4 |
| 2016/0135053 | A1 | 5/2016 | Lee et al. | |
| 2016/0295409 | A1* | 10/2016 | Lee | H04W 12/04 |
| 2016/0323741 | A1* | 11/2016 | Lee | H04W 12/06 |
| 2017/0201930 | A1 | 7/2017 | Chen et al. | |
| 2019/0246268 | A1 | 8/2019 | Walker et al. | |
| 2020/0351648 | A1* | 11/2020 | Fang | H04L 61/5076 |
| 2020/0382951 | A1* | 12/2020 | Lee | H04W 12/037 |
| 2021/0056053 | A1* | 2/2021 | Marson | G06F 13/1668 |
| 2021/0336961 | A1* | 10/2021 | Rao | H04L 63/107 |
| 2021/0360465 | A1* | 11/2021 | Henry | H04L 63/162 |
| 2021/0367872 | A1* | 11/2021 | Huang | H04L 43/12 |
| 2022/0053021 | A1* | 2/2022 | Li | H04L 63/1475 |
| 2022/0086627 | A1* | 3/2022 | Montemurro | H04L 61/25 |
| 2022/0361269 | A1* | 11/2022 | Ficara | H04W 12/02 |
| 2022/0385624 | A1* | 12/2022 | Muccifora | H04L 61/5038 |
| 2023/0300614 | A1* | 9/2023 | Holkal | H04W 12/50 |
| | | | | 726/7 |
| 2024/0354448 | A1* | 10/2024 | Lee | G06F 21/78 |

OTHER PUBLICATIONS

Aura, T., "Cryptographically Generated Addresses", Microsoft Research, Network Working Group, Request for Comments: 3972, Category: Standards Track, https://www.rfc-editor.org/rfc/rfc3972, Mar. 2005, 22 Pages.

Henry, J., et al., "Randomized and Changing MAC Address Framework draft-henry-madinas-framework-00", Internet Engineering Task Force, Internet-Draft, Intended status Informational, Mar. 8, 2021, pp. 1-17.

Montemurro, M., et al., "MAC Privacy and PMKSA Caching", IEEE 802.11-20/0336r2, Jan. 12, 2012, pp. 1-8.

Qadir, S., et al., "A Study of CGA- (Cryptographically Generated Address) Signature Based Authentication of Binding Update Messages in Low-End MIPv6 Node", IEEE, International Conference on Computer and Communication Engineering (ICCCE), https://ieeexplore.ieee.org/document/6271239, Jul. 2012, pp. 510-514.

Zeitz, K., et al., "Designing a Micro-moving Target IPV6 Defense for the Internet of Things", Proceedings of the Second International Conference on Internet-of-Things Design and Implementation, Apr. 2017, pp. 179-184.

* cited by examiner

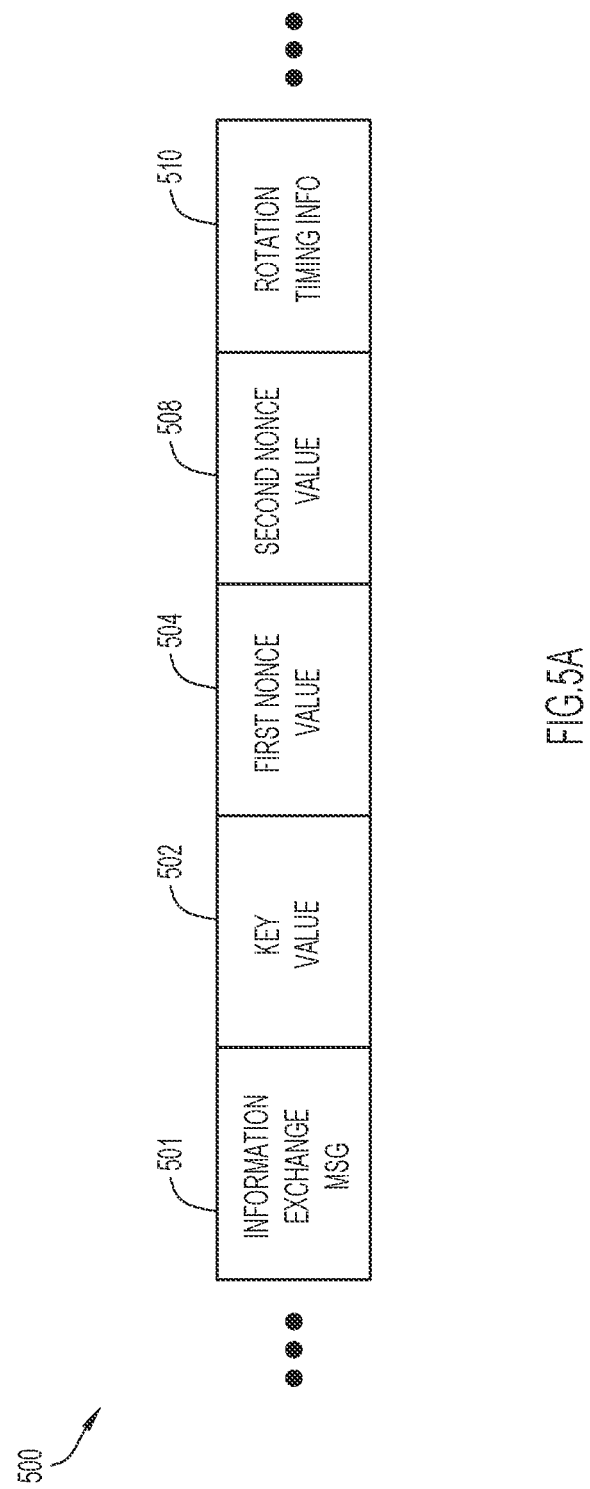

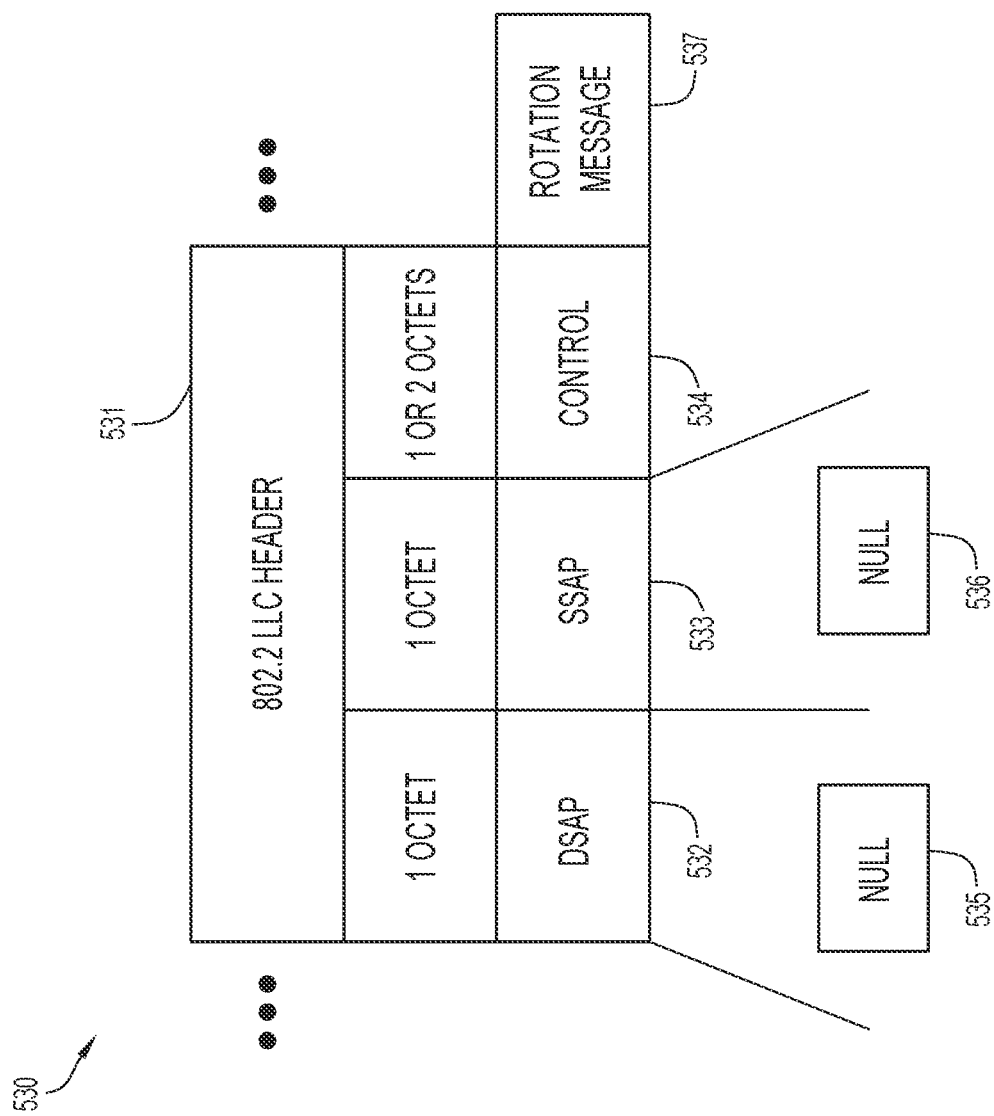

ENCRYPTED NONCES AS ROTATED DEVICE ADDRESSES

PRIORITY CLAIM

This application is a continuation of and claims the benefit of priority to U.S. patent application Ser. No. 17/333,463, filed May 28, 2021, and issued on Feb. 13, 2024, as U.S. Pat. No. 11,902,775, the entirety of which application is incorporated herein by reference.

TECHNICAL FIELD

The present disclosure relates to secure wireless networking.

BACKGROUND

A device address of a wireless client device is generally observable via electronic eavesdropping techniques. If the device address is stable over a relatively long period of time, an eavesdropper can obtain certain information about a user of the wireless client device. For example, the eavesdropper can determine locations visited by the user, and in some cases, types of activities performed by the user via their wireless client device. To improve privacy of users of wireless client devices, many mobile device operating systems have implemented techniques that periodically modify the device address of a wireless client device. This can frustrate an eavesdroppers attempt to correlate wireless traffic to a single wireless client device. However, while the modification or rotation of device addresses has the potential to improve user privacy, it can also present challenges to wireless network infrastructure in some circumstances.

BRIEF DESCRIPTION OF THE DRAWINGS

FIG. 5A illustrates an example format of a message portion containing nonce values used in accordance with an example embodiment.

FIG. 5C illustrates a format of encoding rotation information in a data frame in accordance with an example embodiment.

DESCRIPTION OF EXAMPLE EMBODIMENTS

Overview

Figure 1:
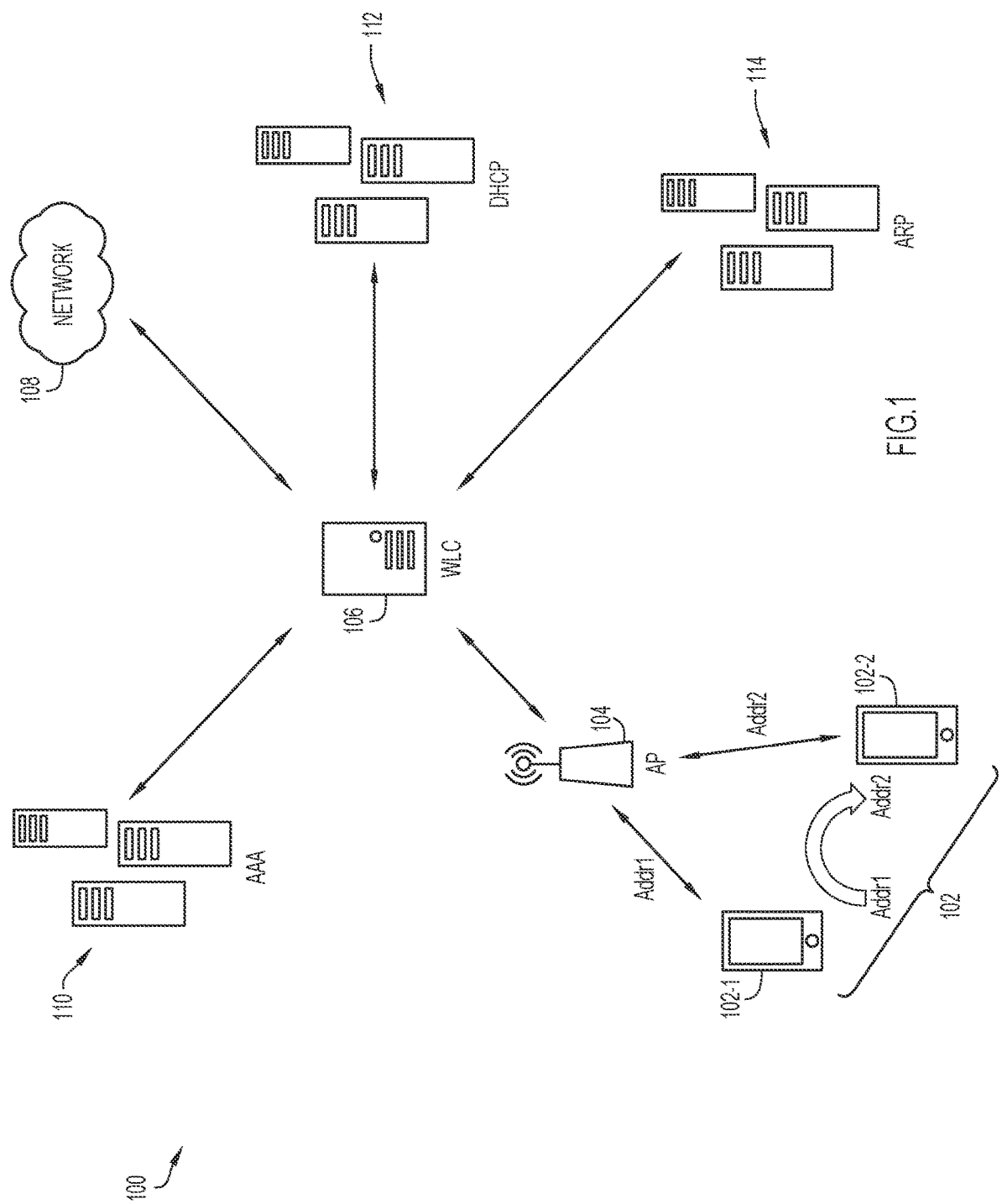
FIG. 1 is an overview diagram illustrating a network environment in accordance with an example embodiment.

One aspect disclosed is a method of address rotation. The method includes establishing a secure communication channel with a wireless client device, receiving, via the secure communication channel, a decryption key and a first nonce value from the wireless client device, receiving a first network message indicating a source address, decrypting, using the decryption key, the source address to obtain a decrypted source address, comparing the decrypted source address to the first nonce value and determining the first network message originated from the wireless client device based on the comparison.

Example Embodiments

Some embodiments disclosed herein provide for coordination between a wireless client device and a network infrastructure device to accomplish a rotation of the wireless client device address, while enabling the wireless network infrastructure to efficiently recognize and adapt to said rotation. The wireless client device and network infrastructure share key and nonce information. The wireless client device encrypts the nonce and uses the encrypted value to generate a device address. Upon receiving the new device address, the wireless network infrastructure is able to decrypt data derived from the new device address and match the decrypted data to the nonce information shared with the wireless client device, thus confirming a message including the new device address originated with the wireless client device. Some embodiments have the wireless client device providing a notification of an impending rotation to the network infrastructure. The notification identifies an approximate timeframe of when the rotation will occur. This approximate timeframe allows the network infrastructure to identify a source of a new device address more efficiently than would otherwise be possible without the notification.

The proposed approach includes performance of an authentication process between the wireless client device and a network infrastructure component, such as an access point (AP). The authentication process conforms, in at least some embodiments, to an IEEE 802.1X authentication, Extensible Authentication Protocol (EAP) authentication, or a pre-shared key (PSK) authentication.

A result of the authentication process includes a key value, such as a pairwise master key (PMK) and/or a pairwise transient key (PTK). Some embodiments rely on the PTK generated during authentication for device address rotation.

In some embodiments, the wireless client device generates a public/private key pair. The wireless client device then sends the public key to the network infrastructure component, along with, in at least some embodiments, a decay timer or rotation interval information. The decay timer or rotation interval information expresses an approximate lifetime of a device address in use by the wireless client device. Generally, the decay timer is not used alone, as time measurement across the wireless client device and network infrastructure is not necessarily uniform. To accommodate this, some embodiments have the wireless client device send a second notification to the network infrastructure, with the notification indicating that the rotation is imminent. Thus, some embodiments provide both a longer term notification of rotation (e.g. rotation will occur at approximately 5 PM), and then a shorter term notification of rotation (e.g. rotation will occur within the next five seconds). In some embodiments, the shorter term notification is provided as a flag in a protected management frame (PMF) such as a protected action frame, or as a flag in a data frame, which can prevent an observer of wireless network traffic from discerning the disclosed techniques are being employed. In some embodiments, the short term notification is provided in a robust security network (RSN) extension element (RSNXE).

In some embodiments, the key and decay timer are communicated to the network infrastructure via an IEEE 802.11 management frame, but other embodiments provide this information as payload in a data frame. One advantage of communicating this information in a data frame is that wireless network observers are unable to distinguish this frame from another data frame, and thus are unable to deduce that a device address rotation scheme is being coordinated between the wireless client device and the network infrastructure.

The disclosed embodiments also include an exchange of at least one initial nonce value between the wireless client device and the network infrastructure. In some embodiments, the nonce value is provided along with the key and/or decay timer discussed above.

When rotating a device address (e.g. such as a media access control (MAC) station address), the wireless client devices generates a value by encrypting, via the key (e.g. a private key or the PTK), a value that is at least based on the nonce value. In some embodiments, the generated value is a 47 bit value (e.g. one less than a MAC station address length). A locally administered bit (e.g. a one value in a second bit of a first octet) is then included to generate a 48 bit value. The 48 bit value is then used as a device address of the wireless client device. The nonce value is generally updated after each device address is generated, so as to add some entropy to the sequence of generated device addresses.

Upon receiving a wireless network message including the new device address, the network infrastructure attempts to identify a wireless client device from which the network message originated. Some embodiments maintain a list of associations between "known" device addresses (e.g. previously processed device addresses) and wireless client devices on a wireless network (e.g. associated with a particular access point). Thus, some embodiments, upon receiving a new device address, search the list to determine if the address is already known to be associated with a particular wireless client device. If the new device address is not found on the list, some embodiments of a network infrastructure device then search a second list that includes wireless devices having an expected rotation, or otherwise an impending rotation within a predetermined period of time. The predetermined period of time relates, in some embodiments, to a predefined elapsed time or in other embodiments, relates to a predefined number of network messages to be exchanged between the wireless client device and the network infrastructure device before the rotation is scheduled to occur.

This second list maintains associations between wireless client devices, their keys, and their nonce values. The second list is generally designed to be relatively short, such that the network infrastructure does not consume substantial resources identifying a source of a new device address by searching this second list. The network infrastructure then sequentially decrypts the new device address using each of the keys identified from the second list, until a decrypted value matches a nonce value associated with the key. Once a source of the new device address is identified, the device address is added to the first list of known device addresses, and the nonce value associated with the identified device is incremented in preparation for the next rotation.

Thus, the network infrastructure is able to validate the new device address originates from the wireless client device and that no other actor is attempting to impersonate the wireless client device (as the actor would not have access to the key and/or the nonce value. This can occur without the wireless client device sharing its device address over the air. In some cases, a session is preserved despite the rotation of the device address. This can occur if, for example, the wireless client device and the network infrastructure device support PMK identifier (PMKID) disconnection from the wireless client device address. In some other embodiments that link the PMKID to the wireless client device address, a four-way (4-way) handshake is performed after the rotation to renew the PTK and associated data. Address rotation according to the method described above can repeat an unlimited number of times, with each rotation based on a unique nonce value. The interval of rotation is regular in some embodiments, or irregular in other embodiments. For example, a random component is introduced into the rotation timing in some embodiments. Long-term and/or short-term rotation notifications are optionally provided in these embodiments. If the rotation interval is variable, some embodiments provide updated long-term notifications of rotation.

Some embodiments maintain multiple independently updated nonce values for a single wireless client device. In these embodiments, initial values of these multiple nonce values are shared between the wireless client device and network infrastructure component. With the disclosed embodiments, both the wireless client device and the network infrastructure agree on which of the independent nonces (e.g., by exchanging an index identifying which nonce value) will be used as a basis to encrypt and form a device address, and/or to verify a decrypted device address originates from the wireless client device. If, for some reason, these nonce values diverge between the wireless client device and network infrastructure, introduction of a new device address based on the nonce value will not succeed. To accommodate such a circumstance, some embodiments employ a secondary or back-up nonce value that can be relied upon by a wireless client device. Thus, for example, if the wireless client device performs a rotation but then is unable to communicate with the network infrastructure component, the wireless client device performs an additional rotation, but generates the next device address based on the second or back-up nonce value. If the network infrastructure copy of the second nonce value agrees with that of the wireless client device, communication is reestablished. The wireless client device then sends control messages to the network infrastructure to reset the value of the first nonce at the network infrastructure such that it is again effective to facilitate network address rotation of the wireless client device.

FIG. 1 is an overview diagram illustrating a network environment 100 in accordance with an example embodiment. FIG. 1 includes a wireless client device 102 in communication with an access point (AP) 104. The wireless client device 102 is shown rotating or otherwise modifying a device address that identifies the wireless client device 102 to the AP 104 and to other devices on a wireless network. A first image 102-1 of the wireless client device 102 represents the wireless client device 102 when the wireless client device 102 is identified via a first device address. A second image 102-2 of the wireless client device 102 represents the wireless client device 102 when it is identified via a second device address. The AP 104 is in communication with a wireless network controller (WLC) 106. The wireless network controller 106 communicates with a network 108. Thus, FIG. 1 shows a communication path is established between the wireless client device 102 and the network 108 via the AP 104 and wireless network controller 106.

FIG. 1 also illustrates an authentication, authorization, and accounting (AAA) server 110 in communication with the wireless network controller 106. A dynamic host control protocol (DHCP) server 112 is also in communication with the wireless network controller 106. An address resolution protocol (ARP) server 114 is also shown in communication with the wireless network controller 106. The AAA server 110 provides authentication services for the wireless client device 102, and in some cases, maintains a mapping of authentication information established by the wireless client device 102 and a device address of the wireless client device 102. Thus, a rotation of a device address of the wireless client device 102 presents a potential to disrupt the mapping maintained by the AAA server 110. Similarly, the DHCP server 112 maintains a mapping between the wireless client device 102 device address and an Internet Protocol (IP) address. Thus, rotation of the device address of the wireless client device 102 threatens to disrupt the mapping cached or otherwise stored by the DHCP server 112. The ARP server 114 maintains, in some cases, a mapping between a device address of the wireless client device 102 and an IP address. Thus, when the wireless client device changes its device address via address rotation, a mapping maintained by the ARP server 114 in at least some circumstances, becomes obsolete, because it references a previously used device address of the wireless client device 102.

As discussed above, an approach for device address rotation is presented such that network infrastructure, such as the AP 104, is able to properly associate a newly observed device address with the wireless client device 102, without the wireless client device 102 and the AP 104 explicitly communicating the new device address between each other on the wireless network. More details on this approach are provided below.

Figure 2:
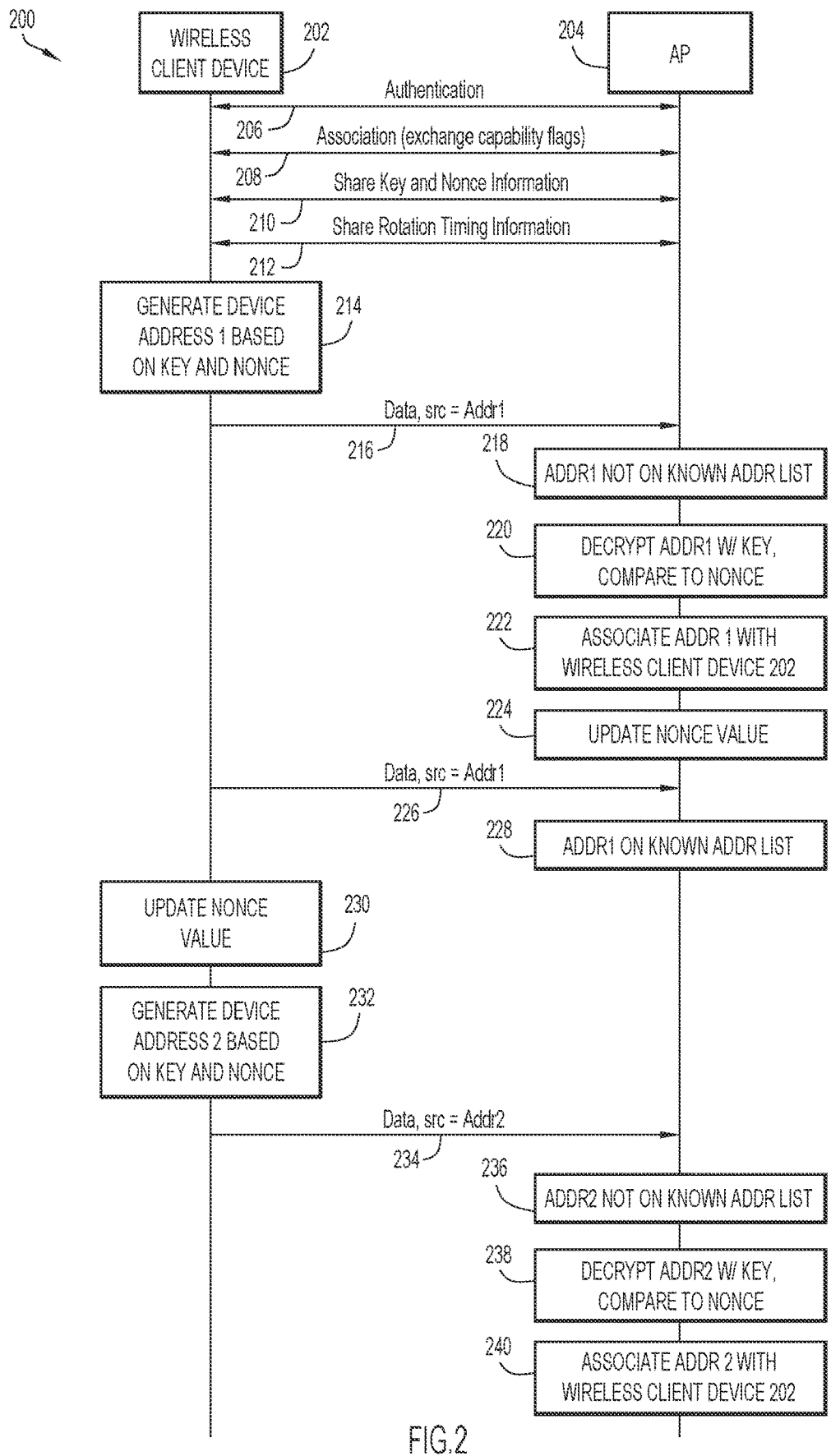
FIG. 2 is a sequence diagram of a device address rotation process in accordance with an example embodiment.

FIG. 2 is a sequence diagram 200 of a device address rotation in accordance with an example embodiment. The sequence diagram 200 shows a wireless client device 202 and an AP 204. The sequence diagram 200 illustrates the wireless client device 202 and AP 204 performing an authentication procedure 206. As discussed above, the authentication procedure may include an 802.1X/EAP authentication and/or a PSK authentication, at least in some embodiments. FIG. 2 also illustrates the wireless client device 202 and the AP 204 performing an association process 208. The authentication procedure 206, in combination with the association process 208, establishes a secure communication channel between the wireless client device 202 and the AP 204.

FIG. 2 then shows the wireless client device 202 and the AP 204 sharing key and nonce information via information exchange 210 over the secure communication channel. In some embodiments, the wireless client device 202 defines a key value and an initial nonce value, and provides this information to the AP 204. In some other embodiments, the AP 204 defines one or more of the key value and/or the initial nonce value and provides this information to the wireless client device 202 in the information exchange 210. In some embodiments, the information exchange 210 includes two different initial nonce values representing two different independently updated nonce values.

The wireless client device 202 and AP 204 also share rotation timing information in an information exchange 212. In some embodiments, the wireless client device 202 indicates an approximate time interval between device rotations via rotation timing indicated in the information exchange 212. In some embodiments, the wireless client device 202 indicates an approximate or predefined number of network messages exchanged in one or both directions between the wireless client device 202 and the AP 204 between rotations of a device address of the wireless client device 202.

The wireless client device 202 then generates, in step 214, a first device address based on the key and nonce information shared between the wireless client device 202 and AP 204. In some embodiments, to generate the first device address, the wireless client device 202 encrypts the nonce value using an encryption key of the key information. In some embodiments, the encrypted nonce value is then conformed to a device address format via one or more of truncation, hashing, bit shifting, or other operations on the encrypted nonce value (e.g., to comply with a 48 bit MAC station address format). For example, in some embodiments, the wireless client device 202 modifies the encrypted nonce value to indicate a locally administered MAC address (e.g. by setting a bit value in a second bit of a first octet of the encrypted nonce value).

The wireless client device 202 then sends a data message 216 to the AP 204. The data message 216 indicates the first device address in a source address field. Upon receiving the data message 216, the AP 204 detects that the first device address is not on a list of known addresses. As discussed further below, in some embodiments, a network infrastructure device, such as the AP 204, maintains a list of known device addresses (e.g. "conformed" encrypted nonce values) and associations between those known addresses and wireless client devices in communication with (e.g., having an active association with an assigned association identifier) the network infrastructure device. Since the first device address was not found on the list of known device addresses, the AP 204 then searches a second list of device information to identify devices, and their associated keys and nonce values, that are expected to perform a device rotation (e.g. have previously indicated, via the information exchange 212, that a rotation is to occur within a predefined time range of a current time). The AP 204 attempts to decrypt the first device address included in the data message 216 using one or more keys associated with one or more devices that have a pending or an impending rotation. In some embodiments, before a source address value is decrypted, a transformation method is performed on it to prepare for the decryption. This transformation is, in some embodiments, an inverse operation to the "conformance" operation performed in step 214 when the encrypted nonce value was conformed to a device address format.

After the decryption in step 220, a resulting value is compared to a nonce value associated with the same device as a key used for the decryption. If a match is identified, the AP 204 concludes that the data message 216 originated from the device associated with the matching nonce value and key in step 222. The first device address is then added to the first list of known device addresses, and an association between this known address and the identified device is established in step 222. The nonce value associated with the identified device is then updated (e.g. incremented or decremented) in step 224 to prepare for a next address rotation by the identified device.

FIG. 2 shows the wireless client device 202 transmitting a second data message 226 to the AP 204. The second data message 226 also includes the first device address in a source address field of the second data message 226. Upon receiving the second data message 226, the AP 204 searches the list of known addresses discussed above with respect to step 218. In step 228, the first device address is found on the list, since it was previously added in step 222 above. As a result, the AP 204 is able to, relatively quickly, associate the second data message 226 with the wireless client device 202.

The wireless client device 202 then updates a local copy of the nonce value in step 230, and generates a second device address based on the updated nonce value and the key in step 232 (e.g. encrypt the nonce value and then conform the encrypted value to a device address format). The wireless client device 202 then transmits a third data message 234, and indicates the second device address in a source address field of the third data message 234. Upon receiving the third data message 234, the AP 204 is unable to find the second device address on its list of known device addresses in step 236. Thus, the AP 204 searches its second list of devices with an impending rotation in step 238. In some embodiments, the AP 204 performs an inverse conversion or transformation operation on the source address value, and then decrypts the transformed value using one or more keys associated with one or more devices having a pending or an impending rotation, until a match is identified between the decrypted value and a nonce value of the corresponding device. Upon identifying a source of the third data message 234, the second device address is added to the known address list, and an association between the second device address and the wireless client device 202 is established in step 240. Note that in both of step 222 and step 240, one or more network resources previously assigned or associated with the wireless client device, are further associated with the first device address and second device address respectively. For example, a mapping between an IP address in use by the wireless client device and the first device address is updated, in some embodiments of step 240, to instead map the IP address to the second device address.

Figure 3:
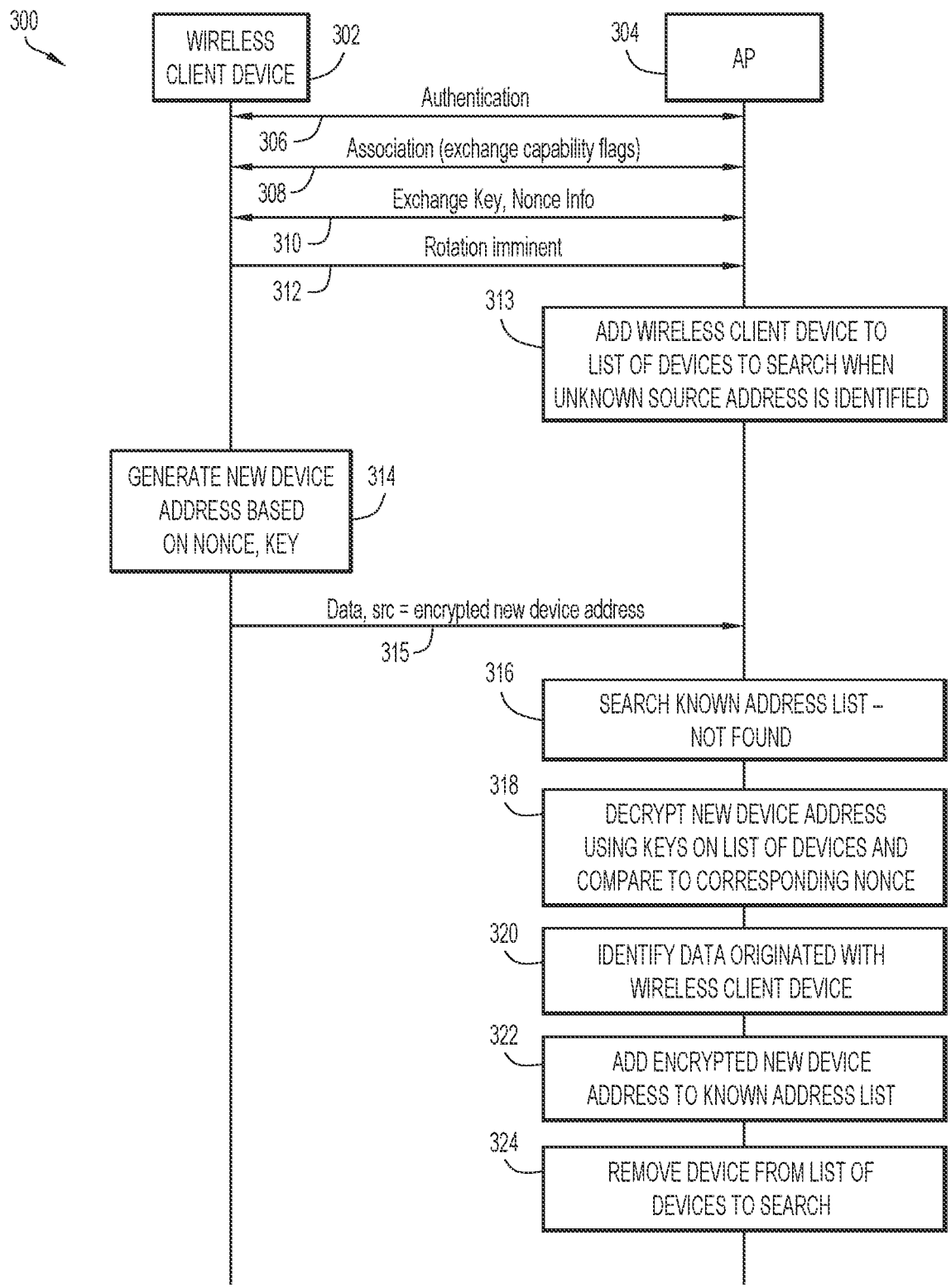
FIG. 3 is a sequence diagram of an address rotation process according to another example embodiment.

FIG. 3 is a sequence diagram of an address rotation according to another example embodiment. The sequence diagram 300 shows a wireless client device 302 and an AP 304. The sequence diagram 300 illustrates the wireless client device 302 and AP 304 performing an authentication procedure 306. As discussed above, the authentication procedure includes an 802.1X/EAP authentication and/or a PSK authentication, at least in some embodiments. FIG. 3 also illustrates the wireless client device 302 and the AP 304 performing an association process 308. The authentication procedure 306, in combination with the association process 308 establishes a secure communication channel between the wireless client device 302 and the AP 304.

FIG. 3 then shows the wireless client device 302 and the AP 304 sharing key and nonce information via information exchange 310. In some embodiments, the wireless client device 302 defines a key value and an initial nonce value, and provides this information to the AP 304. In some other embodiments, the AP 304 defines one or more of the key value and/or initial nonce value and provides this information to the wireless client device 302 in the information exchange 310. In some embodiments, the information exchange 310 includes two different initial nonce values representing two different independently updated nonces.

FIG. 3 then illustrates the wireless client device 302 transmitting a rotation imminent indication 312 to the AP 304. The rotation imminent indication 312 indicates, to the AP 304, that the wireless client device 302 will rotate its device address within a predefined time period from reception of the rotation imminent indication 312. The predefined time period in some embodiments, is less than one second. In some embodiments, the rotation imminent indication 312 does not indicate a specific time but instead indicates a number of messages exchanged (in one direction or both directions) between the wireless client device 302 and the AP 304. In some embodiments, the indicated number of messages is 1, 2, 3, 4, 5, 6, 7, 8, 9, or ten messages. In some embodiments, the indicated number of messages is a power of two, such as $2^0$, $2^1$, $2^2$, $2^3$, $2^4$, $2^5$, $2^6$, or $2^7$. In some embodiments, the rotation imminent indication 312 indicates the maximum number of exchanged messages before the rotation occurs. For example, in some embodiments, the rotation indicator indicates the rotation will occur within less than ten (10) messages exchanged between the wireless client device 302 and the AP 304.

In response to receiving the rotation imminent indication 312, the AP 304 adds, in step 313, the wireless client device 302 to a list of devices maintained by the AP 304 (e.g. the second list discussed above with respect to FIG. 2). The list is searched when an unknown or previously unobserved device address is encountered by the AP 304. The wireless client device 302 then generates, in step 314, a new device address based on the nonce value and key information exchanged with the AP 304 via information exchange 310. As discussed above, in some embodiments, the wireless client device 302 encrypts the nonce value with the key, and then performs, as discussed above, modifications to the encrypted value to ensure conformance with a device address format (e.g. set a locally administrated bit, and/or set a length of the encrypted value to 48 bits total including the locally administrated bit). The wireless client device 302 then transmits a data message 315 to the AP 304, with the data message 315 indicating the new device address in a source address field of the data message 315.

Upon receiving the data message 315, the AP 304 searches a list of known device addresses (e.g. the first list of FIG. 2) in step 316 but does not find the new device address on the list. The AP 304 then searches a second list of devices that have a rotation imminent or impending (e.g., expected within a predefined time period). The AP 304 sequentially inverse transforms and decrypts, in step 318, the new device address included in the data message 315 based on key information associated with a sequential set of devices in the second list, and compares each resulting decrypted value to a respective nonce associated with each of the keys used for decryption. If a match is identified, the AP 304 concludes in step 320 that the data message 315 originated from a device associated with the key and nonce value, in this case the wireless client device 302.

The AP 304 then adds the new device address to a list of known device addresses in step 322, and removes the device from the second list, i.e. the list of devices with rotations impending, in step 324. Removing the device from the second list includes, in some embodiments, updating an expected rotation time to reflect a time not particularly soon relative to a current time (e.g. per the example of the address verification table 660 discussed below in connection with FIG. 6).

Figure 4:
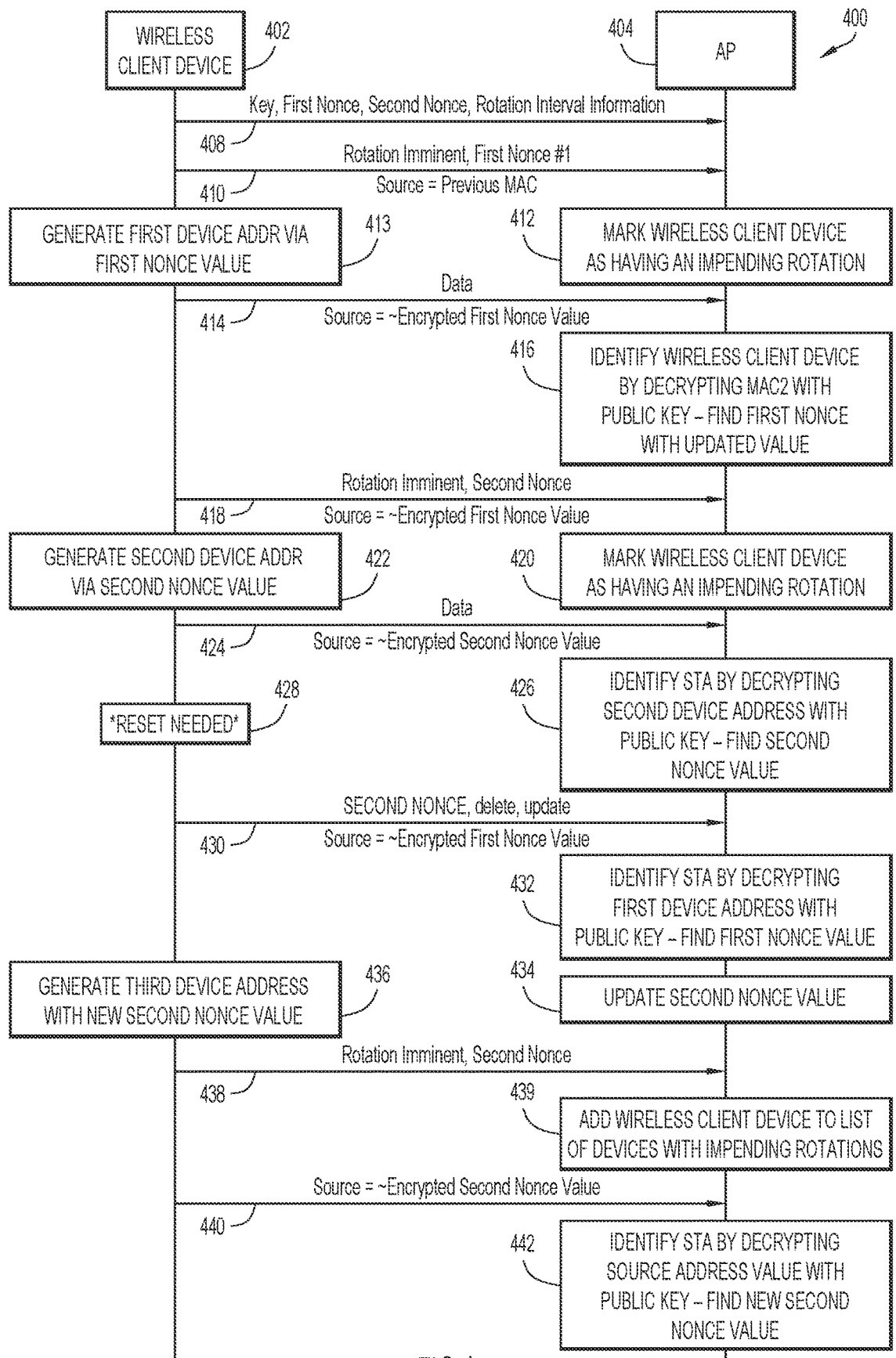
FIG. 4 is a sequence diagram illustrating use of two independent nonces to facilitate recovery when a value of one of the nonces becomes unsynchronized between a wireless client device and a network infrastructure device, according to an example embodiment.

FIG. 4 is a sequence diagram illustrating use of two independent nonces to facilitate recovery when a value of one of the nonces becomes unsynchronized between a wireless client device and a network infrastructure device. The sequence diagram 400 shows a wireless client device 402 and an AP 404. While not shown in FIG. 4, the wireless client device 402 and AP 404 participate, in at least some embodiments, in an authentication procedure and an association procedure, in a manner similar to that described above with respect to FIG. 2 and FIG. 3.

FIG. 4 shows the wireless client device 402 and the AP 404 exchanging, over a secure communications channel, key information, a first nonce value, a second nonce value, and rotation interval information in the message 408. In some embodiments, the message 408 includes one or more of the fields discussed below with respect to FIG. 5A and message portion 500. As discussed above, while in some embodiments, the wireless client device 402 generates the initial first nonce value, initial second nonce value, and/or the rotation interval information, in other embodiments, a network infrastructure device, such as the AP 404, generates the nonce values and/or interval information.

FIG. 4 shows wireless client device 402 sending a rotation imminent notification message 410 to the AP 404. The rotation imminent notification message 410 indicates that the wireless client device 402 will rotate its device address within a predefined number of time units or after an elapsed period of time, or will rotate its device address after a predefined number of additional messages are exchanged between the wireless client device and the AP 404. A source address of the rotation imminent notification message 410 is a previous source address, known by the AP 404 to identify the wireless client device 402. In response to receiving the rotation imminent notification message 410, the AP 404 places, in step 412, the wireless client device 402 on a list of devices (e.g. the second list of FIG. 2) that have a rotation impending or otherwise expected to occur within a predefined time period.

The wireless client device 402 then generates a first device address in step 413 based on the first nonce value. The first device address is generated, at least in part, by encrypting the first nonce value using the key information, and then conforming the encrypted value to a device address format.

A data message 414 is sent by the wireless client device 402, which identifies the wireless client device 402 using the newly generated first device address (e.g., in a source address field of the data message 414). Upon receiving the data message 414, the AP 404, in step 416, reverse conforms the device address included in the data message 414, and decrypts the resulting value. The AP 404 then compares the resulting value of the decryption to the local copy of the first nonce value of the AP 404. By finding a match, the AP 404 recognizes that the data message 414 originates from the wireless client device 402. The AP 404 then associates one or more network resources that were previously assigned or allocated to the wireless client device 402 (e.g. to the previous device address), to the source address value of data message 414.

The wireless client device 402 then sends a second rotation imminent message 418. The second rotation imminent message 418 indicates that the wireless client device will rotate its device address within a timeframe that is either predefined or specified in the second rotation imminent message 418. Alternatively, the second rotation imminent message 418 specifies when the rotation will occur based on a number of messages exchanged between the wireless client device 402 and AP 404 before the rotation occurs. The second rotation imminent message 418 indicates that the new device address resulting from the rotation will be based on the second nonce value (and not the first nonce value). In some embodiments, the second rotation imminent message 418 includes one or more of the fields discussed below with respect to the rotation imminent message 550 of FIG. 5D.

In response to receiving the second rotation imminent message 418, the AP 404 places information relating to the wireless client device 202 on the list of devices with impending rotations in step 420. That the upcoming rotation is based on the second nonce value is also stored (e.g. in the next rotation nonce value field 668, discussed below with respect to FIG. 6).

The wireless client device 402 then generates a second device address in step 422 based on the second nonce value as indicated in the second rotation imminent message 418. The wireless client device 402 then transmits a data message 424 that identifies the wireless client device 402 via the encrypted and conformed second nonce value in a source address field of the data message 424. In response to receiving the data message 424, the AP 404 searches, in step 426, the list of devices with impending rotations and finds the wireless client device 402 on the list. The AP 404 inverse transforms the source address value included in the data message 424, and then decrypts the resulting data via the key associated with the wireless client device 402. The AP 404 compares the decrypted value to the second nonce value, given that the second rotation imminent message 418 indicated the next rotation would use the second nonce value as a reference value.

The wireless client device 402 then determines that, in step 428, the second nonce value needs to be reset. This determination can occur under a variety of circumstances. For example, perhaps the AP 404 did not respond properly to the data message 424, and the wireless client device 402 determines, as a result, that the AP 404 did not properly decode the data message 424, and thus the second nonce value is to be reset. Thus, the wireless client device 402 transmits a maintenance message 430, which indicates to the AP 404 that the second nonce value is being set to a particular value, specified in the maintenance message 430. An example maintenance message is described below with respect to FIG. 5E.

Note that since the wireless client device 402 determines that the second nonce value may be out of sync with the AP 404, the wireless client device inhibits communication with the AP 404 via device addresses derived from the second nonce value until the second nonce value is resynchronized. Thus, the maintenance message 430 uses a source address value that is derived from the first nonce value, which remains in sync between the wireless client device 402 and the AP 404.

Upon receiving the maintenance message 430, the AP 404 decrypts the source address value in step 432 using the key associated with the wireless client device 402, and determines the decrypted value matches the first nonce value. Thus, the maintenance message 430 originated from the wireless client device 402. The AP 404 then updates the wireless client device 402 second nonce value in step 434 per the maintenance message 430.

The wireless client device 402 then generates a third device address based on the resynchronized second nonce value in step 436. The wireless client device 402 sends a third rotation imminent message 438, which indicates the rotation will be based on the second nonce value. In response to the third rotation imminent message 438, the AP adds the wireless client device 402 to a list of devices with impending rotations in step 439. The wireless client device 402 then sends a data message 440, and identifies itself via a source address field of the data message 440 using the encrypted second nonce value that was conformed to a device address format. Because the AP 404 has previously updated its second nonce value and is now synchronized with the second nonce value of the wireless client device, the AP 404 is able to successfully identify, in step 442, that the data message 440 originates from the wireless client device 402.

FIG. 5A illustrates an example format of a message portion in accordance with an example embodiment. The message portion 500 includes an information exchange message indicator 501, key value field 502, a first nonce value field 504, a second nonce value field 508, and a rotation timing information field 510. The information exchange message indicator 501 indicates that the message portion 500 is a particular type of message having the format discussed below with respect to FIG. 5A. The key value field 502 identifies a key value used for decrypting a device address included in a source address field of a data message received by a network infrastructure component, such as an access point. In some embodiments, the key value is a value of a public key include in a public key/private key pair. In these embodiments, a wireless client device encrypts a nonce using the private key, and the network infrastructure device decrypts a value derived from a source address value using the key value include in the key value field 502. The first nonce value field 504 represents a starting nonce value used for validating a source device address generated by a wireless client device transmitting the message portion 500. As discussed above, after a source device address is decrypted using the key, the resulting value is compared to the nonce value. If the two values match, the network infrastructure device is able to confirm that the network message originated from the device providing the key/nonce value. The second nonce value field 508 indicates a second starting nonce value of a second nonce. As illustrated above with respect to FIG. 3, some embodiments implement multiple independent nonce values, each of which can be independently updated or reinitialized. This can be helpful under circumstances in which a wireless client device and network infrastructure device become desynchronized with respect to values of a particular nonce. The rotation timing information field 510 indicates in various embodiments an interval between device address rotations. The interval is defined, in some embodiments, by elapsed time (e.g. by specifying a number of time units until rotation or an absolute time of rotation (e.g. in Greenwich Mean Time (GMT), while in other embodiments, the interval is defined by a number of data messages exchanged in one or both directions between the two devices exchanging the message portion 500.

Figure 5B:
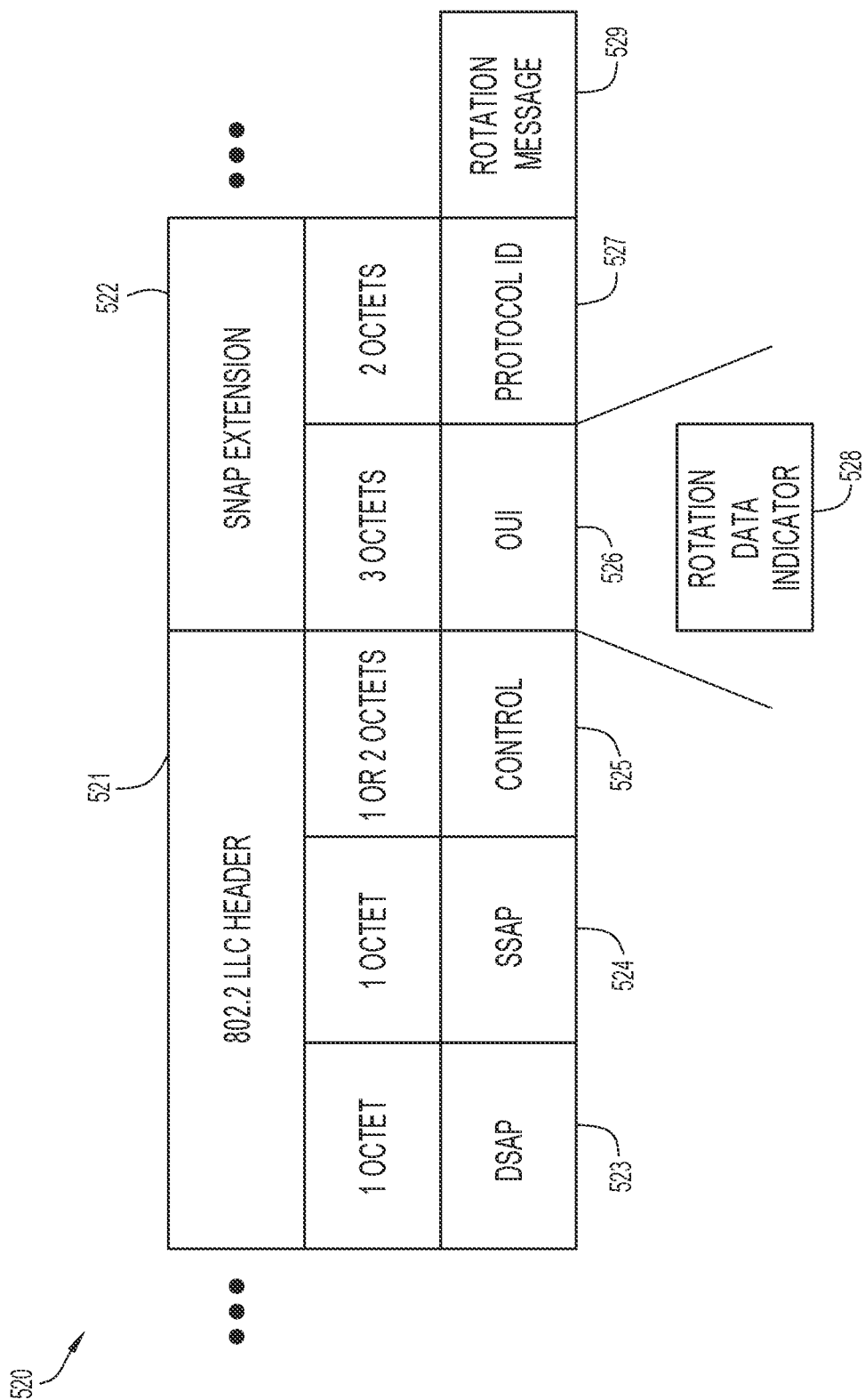
FIG. 5B illustrates a format of encoding rotation information in a data frame in accordance with an example embodiment.

FIG. 5B illustrates a format of encoding rotation information in a data portion of a data frame in accordance with an example embodiment. FIG. 5B shows a frame 520 that includes an IEEE 802.2 Logical Link Control (LLC) header 521 and a subnetwork access protocol (SNAP) extension 522. The 802.2 LLC header 521 includes a destination service access point (DSAP) field 523, a source service access point (SSAP) field 524, and a control field 525. The SNAP extension 522 includes an organizationally unique identifier (OUI) field 526, a protocol identifier field 527.

Predefined values in one or more of the DSAP field 523 and SSAP field 524 indicate that the OUI field 526 defines a destination protocol for the frame 520. Some embodiments set the DSAP field 523 and/or SSAP field 524 to indicate the presence of the SNAP extension 522, and define a particular predefined value (e.g., a rotation data indicator 528) in the OUI field 526 that indicates the frame 520 includes rotation data, represented as rotation message 529. Rotation message 529 is thus in a data portion of the frame 520. Examples of rotation message 529 are discussed below with respect to FIG. 5D and FIG. 5E.

FIG. 5C illustrates a format of encoding rotation information in a data frame in accordance with an example embodiment. FIG. 5C shows a frame 530 that includes an 802.2 LLC header 531. The 802.2 LLC header 531 includes a destination service access point (DSAP) field 532, a source service access point (SSAP) field 533, and a control field 534.

Predefined values in one or more of the DSAP field 523 and SSAP field 524 indicate that there is no upper level protocol information included in the frame, and thus the frame is to be processed locally (e.g. this is done in some cases in IEEE 802.2). FIG. 5C shows the DSAP field 532 and SSAP field 533 being set to null value 535 and null value 536 respectively. This indicates, in some embodiments, the presence of a rotation message 537 in the frame 530. Examples of the rotation message 537 are discussed below with respect to FIG. 5D and FIG. 5E.

Figure 5D:
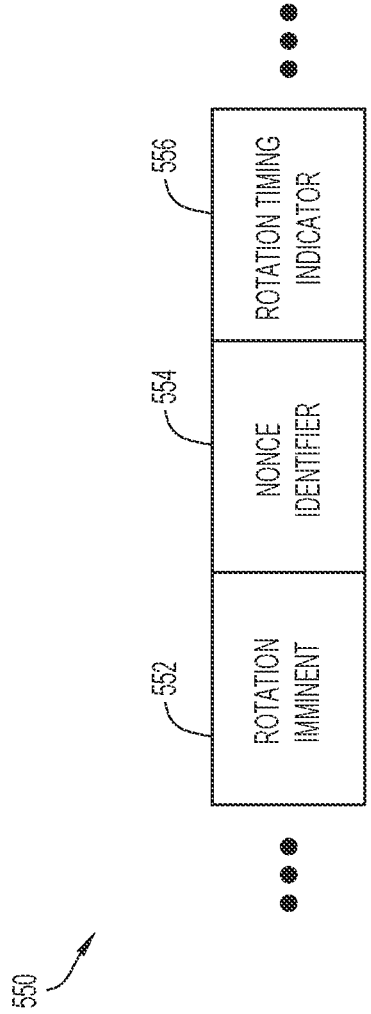
FIG. 5D illustrates a format of a portion of a rotation imminent message in accordance with an example embodiment.

FIG. 5D illustrates a format of a portion of a rotation imminent message 550 in accordance with an example embodiment. The rotation imminent message 550 includes a rotation imminent indicator 552, a nonce identifier field 554, and a rotation timing indicator 556. The rotation imminent indicator 552 indicates that the rotation imminent message 550 is indicating that a rotation is imminent. For example, some embodiments implement message type codes that differentiate different types of message exchanged by the disclosed embodiments. The nonce identifier field 554 indicates a particular nonce value that will be used to facilitate the upcoming rotation. Thus, for example, if an implementation supports three different independent nonce values, the nonce identifier field 554 identifies which of the three independent nonce values upon which the next device address will be based. The rotation timing indicator 556 indicates when the rotation will occur, either in terms of elapsed time or a number of messages exchanged between the device transmitting the rotation imminent message 550 and the device receiving the rotation imminent message 550.

Figure 5E:
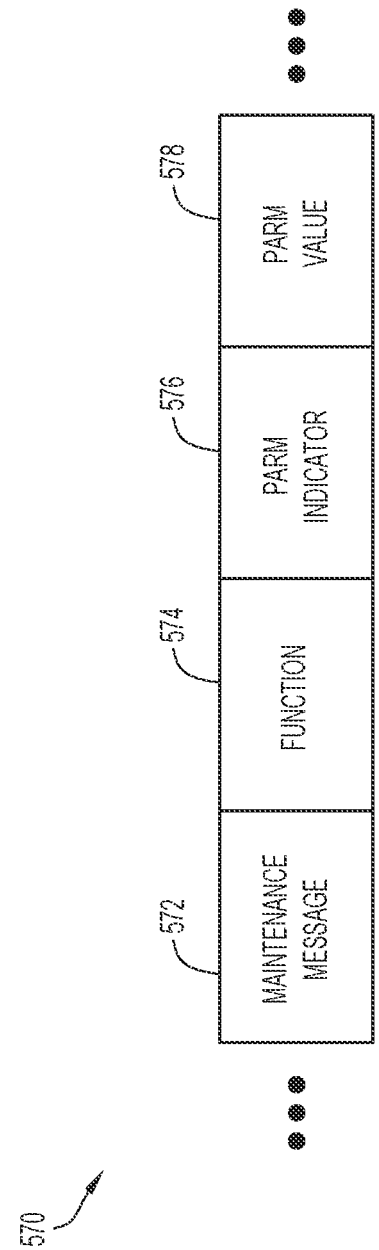
FIG. 5E illustrates a format of a portion of a maintenance message in accordance with an example embodiment.

FIG. 5E illustrates a format of a portion of a maintenance message 570 in accordance with an example embodiment. The maintenance message 570 includes a maintenance message indicator 572, a function field 574, a parameter indicator field 576, and a parameter value field 578. The maintenance message indicator 572 indicates that, when set to a particular predefined value, the maintenance message 570 conforms to the format described with respect to FIG. 5E. The function field 574 indicates a particular function performed by the maintenance message 570. For example, the function field 574 indicates, in some embodiments, one of a plurality of predefined values that are mapped to functions, such as reset parameter, increment parameter, decrement parameter, or other function. The parameter indicator field 576 indicates a particular parameter affected by the maintenance message 570. For example, if an embodiment implements three independent nonce values, the parameter indicator field 576 indicates, in some embodiments, which of the three independent nonce values are operated on by the maintenance message 570. The parameter value field 578 indicates an updated value for the identified parameter.

Figure 5F:
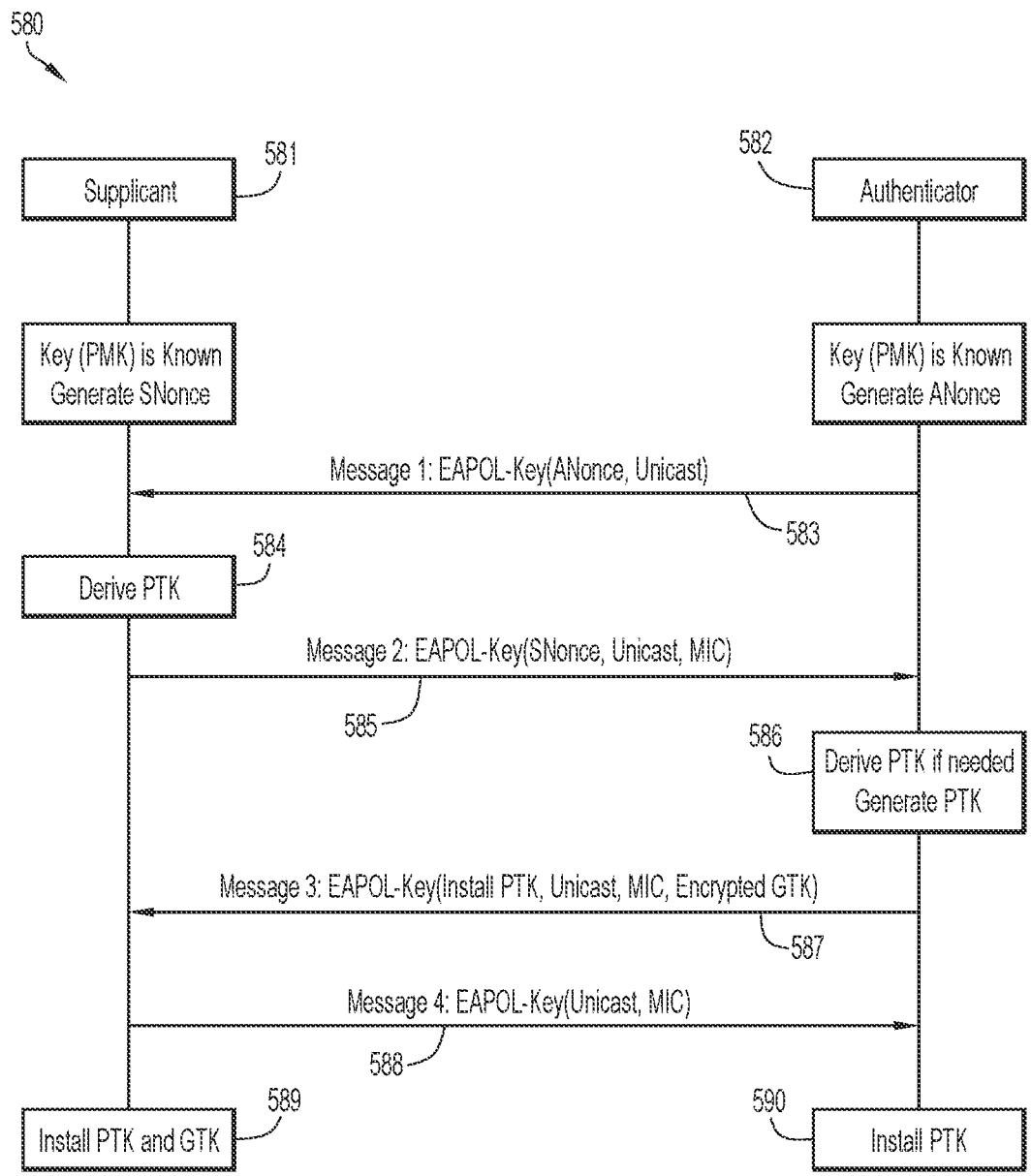
FIG. 5F illustrates a 4-way handshake between a supplicant and an authenticator in accordance with an example embodiment.

FIG. 5F illustrates a 4-way handshake 580 between a supplicant 581 (e.g., a wireless client device) and an authenticator 582 (e.g. a network infrastructure component such as an AP) in accordance with an example embodiment. The example authentication provided via the 4-way handshake 580 is equivalent to, in some embodiments, one or more of the authentication procedure 206, authentication procedure 306. In some embodiments, a key derived from the 4-way handshake 580 is used as an encryption and/or decryption key in the disclosed embodiments, to encrypt and/or decrypt nonce values.

FIG. 5F shows that the supplicant 581 and the authenticator 582 are in possession of a pairwise master key (PMK) before the 4-way handshake process begins. The PMK is obtained by the supplicant 581 and authenticator 582 via an authentication process that occurs prior to the 4-way handshake.

FIG. 5F shows the authenticator 582 transmitting an Extensible Authentication Protocol over Local Area Network (EAPOL)-key message 583 to the supplicant. The EAPOL-key message 583 includes an authenticator number once (ANonce). In response to receiving the EAPOL-key message 583, the supplicant is able to derive a Pairwise Transit Key (PTK) in step 584. The supplicant 581 responds to the EAPOL-key message 583 with an EAPOL-key message 585, which includes a supplicant number once (SNonce), and a message integrity code (MIC). Upon receiving the EAPOL-key message 585, the authenticator 582 is able to derive a PTK in step 586. If needed, the authenticator 582 also generates a Group Temporal Key (GTK).

After deriving the PTK, the authenticator 582 generates an EAPOL-key message 587, indicating the supplicant 581 is to install the PTK. The EAPOL-key message 587 also includes a MIC, and the encrypted GTK (if applicable).

In response to receiving the EAPOL-key message 587, the supplicant 581 transmits an EAPOL-key message 588, which confirms that the EAPOL-key message 587 was received, and that the supplicant is installing the PTK. Each of the supplicant 581 and authenticator 582 then install the PTK in steps 589 and 590 respectively. The supplicant 581 also installs the GTK in step 589.

Figure 6:
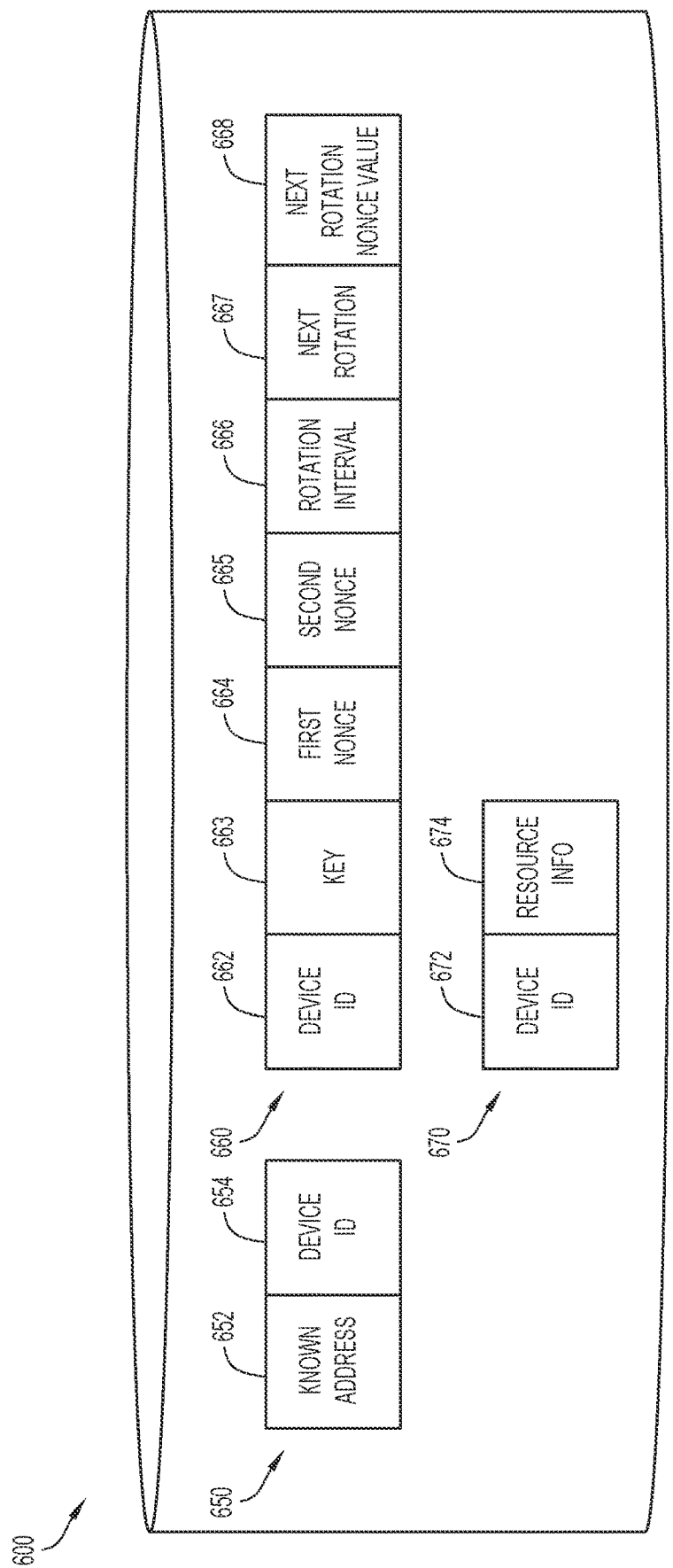
FIG. 6 illustrates a data store in accordance with an example embodiment.

FIG. 6 illustrates a data store in accordance with an example embodiment. In some embodiments, the data store is maintained by a network infrastructure device, such as an access point. While the example data structures of FIG. 6 are discussed as relational database tables, the disclosed embodiments are not limited to these examples. Furthermore, the discussion of FIG. 6 describes a single row of each table, but one of skill would recognize that each table may include one or more rows, with each row storing different data values.

The data store 600 includes a known address table 650, an address verification table 660, and a resource association table 670. Each row or record of the known address table 650 includes a known address field 652 and a device identifier field 654. The known address field 652 stores a value of a known address previously processed by a device maintaining the data store 600. The device identifier field 654 identifies a device originating messages that indicate the device address of the known address field 652. Some embodiments of a network infrastructure device rely on the known address table 650 to efficiently identify a source device of a received network message, and to ensure the message is processed in accordance with properties or resources assigned to the source device. For example, some embodiments identify resource information (e.g. via resource information field 674 discussed below) associated with the device by cross referencing the device identifier fields 654 and 672 (also discussed below).

Each row or record of the address verification table 660 includes a device identifier field 662, key value field 663, first nonce field 664, second nonce field 665, rotation interval field 666, a next rotation field 667, and a next rotation nonce value field 668. The device identifier field 662 uniquely identifies a particular wireless client device, and can be cross referenced with any of the other device identifier fields of FIG. 6. The key value field 663 stores a key associated with the device (identified via device identifier field 662). The key value is used to decrypt data derived from a source address value when determining whether a particular network message originated from a device identified via device identifier field 662. The result of this decryption is referred to herein as a decrypted source address, although, in at least some embodiments, the source address is modified somewhat (e.g. via an inverse operation as described above) before the decryption is performed.

Each of the first nonce field 664 and second nonce field 665 store current nonce values associated with the device. The nonce values are updated after a device address is matched to the nonce value by the network infrastructure device maintaining the address verification table 660. The rotation interval field 666 indicates an approximate time period between rotations by the device or an approximate number of messages exchanged with the device before a rotation occurs. The next rotation field 667 estimates when a next rotation will be performed by the device, in either elapsed time or number of messages exchanged. A list of devices with impending rotations is based, in some embodiments, on selecting rows of the address verification table 660 with next rotation field 667 values meeting one or more criterion. For example, the criterion may evaluate an amount of time that needs to transpire before the rotation and compare the amount of time to a predefined threshold amount of time. If the amount of time is below the threshold, the particular row of the address verification table 660 is considered to have an impending rotation. The criterion may independently or additionally compare a count of a number of messages that will be exchanged between the wireless client device and the network infrastructure device before the count reaches a predefined threshold, indicating the rotation will occur. If the number of messages remaining to be exchanged (before rotation) is below a predefined threshold, the row of the address verification table 660 is considered to have an impending rotation in some embodiments.

The next rotation nonce value field 668 indicates which of the first nonce of first nonce field 664 or second nonce value of second nonce field 665 will be referenced during the next device rotation. In other words, when attempting to decrypt a next encountered unknown source address value, which nonce value should the decrypted value be compared to.

Each row or record of the resource association table 670 includes a device identifier field 672 and a resource information field 674. The device identifier field 672 identifies a particular wireless client device and the resource information field 674 defines information regarding a particular network resource that is mapped, associated, assigned or otherwise relates to the identified device. For example, some embodiments of the resource information field 674 define an IP address assigned to the device, an external station address, or a switch port number assigned to the device. The resource association table 670, in some embodiments, governs adjustments made by network infrastructure to routing and/or mapping information of a network upon a determination that a new device address is associated with a particular wireless client device with existing network resource assignments or associations.

Figure 7:
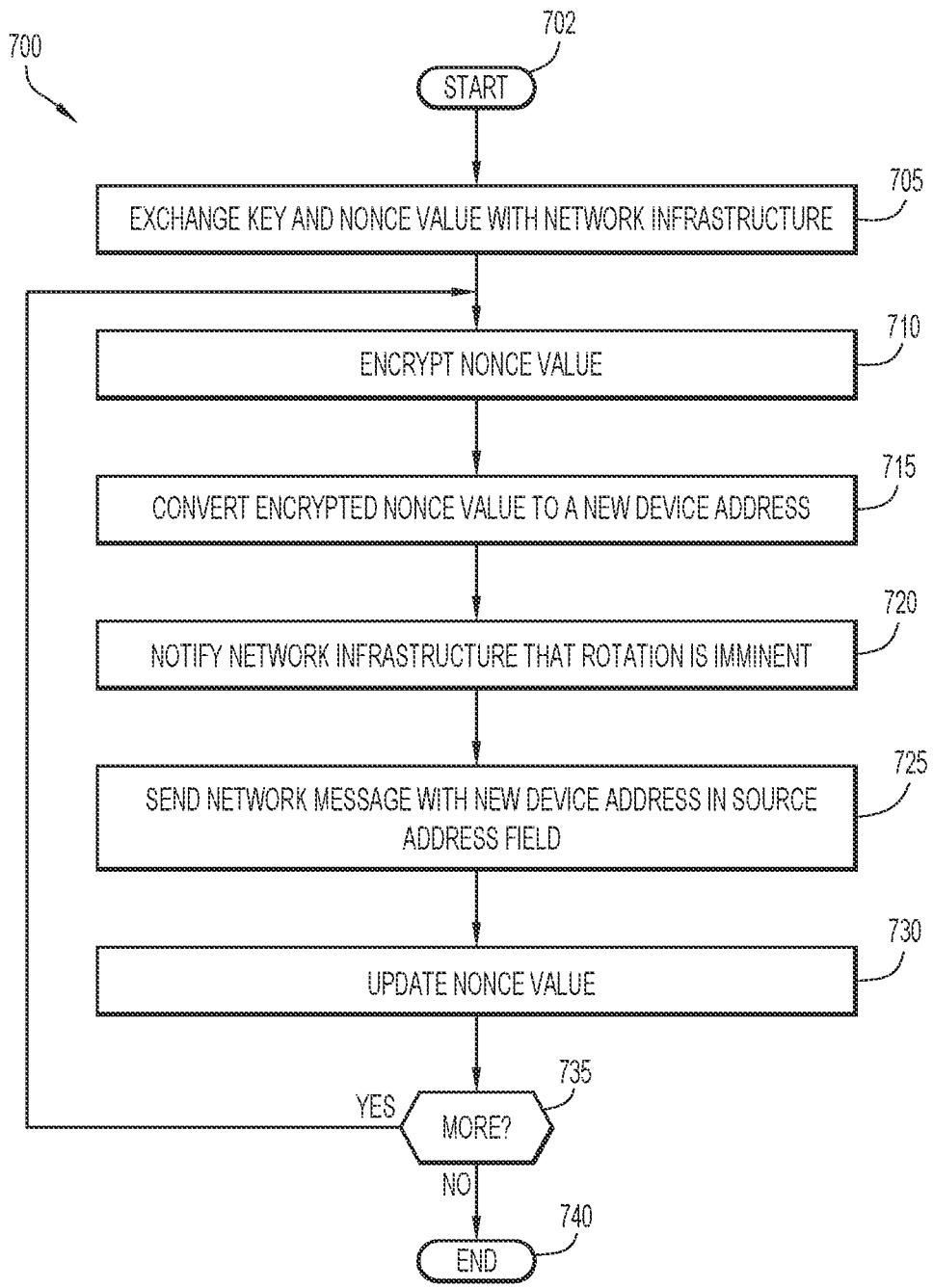
FIG. 7 is a flowchart of a method of address rotation that may be performed by a wireless client device, according to an example embodiment.

FIG. 7 is a flowchart of a method of address rotation according to an example embodiment. In some embodiments, the method 700 discussed below with respect to FIG. 7 is performed by a wireless client device. In the discussion below, a device performing the method 700 is referred to as an "executing device."

After start operation 702, method 700 moves to operation 705. In operation 705, a key value and an initial first nonce value are exchanged with a network infrastructure device (e.g. such as an access point). In some embodiments, the key value and/or first nonce value are defined by the wireless client device and transmitted to the network infrastructure device in a network message including one or more of the fields of message portion 500, discussed above with respect to FIG. 5A. In some embodiments, operation 705 includes generating a public/private key pair, and providing the public key to the network infrastructure device. Some embodiments of operation 705 include performing an authentication and/or association procedure with the network infrastructure device. In some embodiments, the key value is derived from the authentication procedure (e.g. such as a PMK or PTK). Some embodiments of operation 705 exchange multiple independently updated nonce values with the network infrastructure device (e.g., the first nonce value and a second nonce value).

The first nonce value exchanged in operation 705 is an initial nonce value, and is progressively updated, in at least some embodiments, with each generation of a device address. Thus, in some embodiments, only one device address value is generated for each nonce value, with a sequential set of nonce value(s) beginning with the nonce value exchanged in operation 705. Despite this general solution, some embodiments may update the initial nonce value before generating the first device address.

In some embodiments of operation 705, rotation interval information is exchanged with the network infrastructure. As discussed above, rotation interval information indicates, in various embodiments, an amount of time between address rotations or a number of network messages exchanged between the wireless client device and network infrastructure component between address rotations.

In operation 710, the first nonce value is encrypted. In some embodiments that utilize the public/private key pair discussed above, the encryption is performed using the private key. In some other embodiments that utilize a single key for both encryption and decryption, the encryption of the nonce value is based on the key value exchanged in operation 705.

In operation 715, the encrypted nonce value is converted to a new device address. As discussed above, in some embodiments, an encrypted value of a nonce does not necessarily conform to a format of a device address, in at least some embodiments. Thus, some embodiments of operation 715 perform one or more of hashing, truncating, masking, bit shifting, or other operations to repeatably convert the resulting encrypted value into a value that complies with device address format requirements. As discussed above, some embodiments set a locally administrated bit of a 48 bit MAC address field, and populate the other 47 bits of this embodiment of the new device address based on the encrypted value. Note that while a wireless client device performs operations to convert the encrypted nonce value to a device address format, a network infrastructure device decoding the resulting device address perform an inverse conversion operation, to essentially reverse these operations, before attempting to decrypt the resulting value.

In operation 720, a notification that an address rotation is imminent is transmitted to the network infrastructure device. The notification indicates, in some embodiments, that the executing device will rotate a device address within a predefined time period or number of exchanged messages. Generally, the notification of operation 720 indicates a shorter period of time than any interval information exchanged in operation 705 above. In some embodiments, the notification indicates which of a plurality of nonce values is used to generate the new device address resulting from the rotation. Thus, in the example above, the notification would indicate the first nonce. If operation 710 had operated on a second nonce value, the notification of operation 720 indicates, in at least some embodiments, the second nonce value (e.g. some embodiments assign an index to each nonce value, which allows both devices to identify which of the nonce values is relevant for a particular rotation).

In operation 725, a network message is generated to include the new device address of operation 715 in a source address field of the network message. The network message is then transmitted to the network infrastructure device.

In operation 730, the first nonce value is updated. Updating a first nonce value includes, in various embodiments, incrementing or decrementing the first nonce value by a predefined constant. The updating of the first nonce value is generally consistent on the wireless client device and the network infrastructure, to thus ensure the nonce values remain equivalent at both devices.

Decision operation 735 determines whether additional processing is to be performed. If so, processing returns to operation 710, where additional address rotations may be performed, generally after any specified rotation intervals have elapsed. If processing is complete, method 700 moves from decision operation 735 to end operation 740.

Thus, method 700, in some embodiments, is performed multiple times or iteratively. Each iteration generates a different device address based on a key value and a different nonce value is a sequence of nonce values. After a device address is generated based on a particular nonce value, the nonce is updated to generate a subsequent nonce value in the sequence. Some embodiments generate a first group of device addresses based on a first sequence of independently updated nonce values, and a second group of device addresses based on a second sequence of independently updated nonce values. Use of the first group and second group of device addresses is interleaved in some embodiments.

Figure 8:
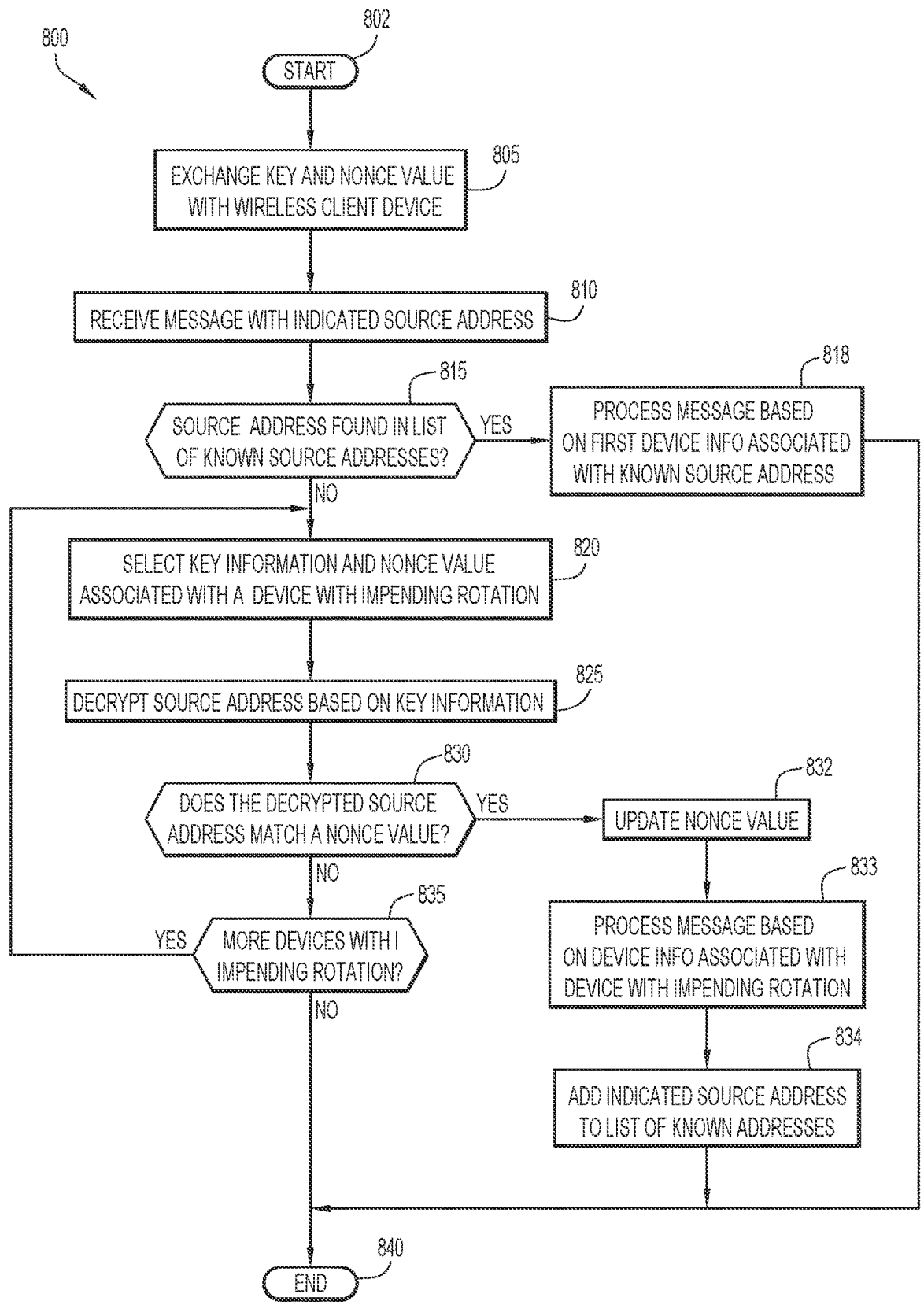
FIG. 8 is a method of address rotation that may be performed by a network infrastructure device, in accordance with an example embodiment.

FIG. 8 is a method of address rotation in accordance with another example embodiment. In some embodiments, the method 800 of FIG. 8 is performed by a network infrastructure device, such as an access point or a wireless network controller. In the discussion below, a device performing the method 800 is referred to as an "executing device." As discussed above, some embodiments of a network infrastructure device maintain at least two lists. A first list stores device addresses that have already been associated with a particular wireless client device. This list is searched first when a network message is received. If the device address has previously been processed, the first list provides for more efficient identification of a source of the network message. If the device address is not found on the first list, a second list of devices is searched. The second list identifies those devices with address rotations impending, or otherwise expected to occur within a relatively short time period. Limiting the second list to these devices can provide for a more efficient search and subsequent identification of a source of a new device address.

After start operation 802, method 800 moves to operation 805. In operation 805, key information and nonce value information are exchanged with a wireless client device. In some embodiments, the key information and/or nonce value information are defined by the wireless client device and transmitted to the executing device in a network message including one or more of the fields of message portion 500, discussed above with respect to FIG. 5A. In some embodiments, the information exchanged in operation 805 is exchanged in a protected management frame or in a data frame (e.g. per FIG. 5B or FIG. 5C discussed above). Thus, in some embodiments, operation 805 parses or otherwise decodes a payload portion of a data packet to obtain the key information and nonce value information.

In some embodiments of operation 805, the key information indicates a public key of the wireless client device. Some embodiments of operation 805 include performing an authentication and/or association procedure with the wireless client device. In some embodiments, the key information includes a key derived from the authentication procedure (e.g. such as a PMK or PTK).

The nonce value exchanged in operation 805 is an initial nonce value, and is progressively updated, in at least some embodiments, with each generation of a device address based on the nonce value. Thus, in some embodiments, only one device address value is generated for each nonce value, with a sequential set of nonce value(s) beginning with the initial nonce value exchanged in operation 805. Despite this general solution, some embodiments may update the initial nonce value before generating the first device address.

Some embodiments exchange multiple independently updated nonce values in operation 805. For example, as discussed above with respect to FIG. 4, some embodiments maintain two separate independently updated nonce values to provide for a back-up in case a first of the nonce values becomes out of sync between a wireless client device and a network infrastructure component.

In some embodiments of operation 805, rotation interval information is exchanged with the wireless client device. As discussed above, rotation interval information indicates, in various embodiments, an amount of time between address rotations or a number of network messages exchanged between the wireless client device and network infrastructure component between address rotations.

In operation 810, a network message is received. A source address field of the network message is decoded from the network message to determine a source address value. In decision operation 815, a determination is made as to whether the source address value decoded in operation 810 is present in a list of known device addresses (previously identified device addresses). As discussed above, some embodiments maintain a list of known device addresses to provide for efficient identification of a source of a network message. Decision operation 815 searches this list of known device addresses (e.g. analogous to the known address table 650 of FIG. 6) in some embodiments to identify whether the source address value is present. If the source address value is present in the list of known device addresses, method 800 moves from decision operation 815 to operation 818, where the network message is processed based on device information associated with the known source address in the list. For example, as discussed above, in some embodiments, one or more address mappings are associated with a particular wireless client device, and thus, the network message is routed or addressing information is sometimes updated based on a determination that the network message originates from a particular wireless client device. Some embodiments of operation 818 access a data structure analogous to the resource association table 670, discussed above with respect to FIG. 6, when assigning or remapping resources to the source address value.

In operation 820, key information and a nonce value associated with a device are selected from a list of devices with impending rotations. As discussed above with respect to FIG. 6 for example, some embodiments maintain a list of wireless client devices with rotations impending (e.g. expected to occur within a time range that is within a predefined distance of a current time). If there are one or more devices on this list, operation 820 selects a device in the list, and obtains key and nonce value information associated with the device. Thus, as discussed below, in an iterative embodiment of method 800, method 800 searches the list of wireless client devices with rotations impending, until key and nonce information associated with one of the wireless client devices results in identification of a match between a decrypted source address and a nonce value.

Some embodiments support multiple independent nonce values per device. Thus, in some of these embodiments, the device appears twice in the list (once for each nonce value). Alternatively, a single device has multiple nonce values indicated in the list. Thus, operation 820 selects a previously unselected nonce value. If multiple nonce values are present, operation 820 operates on the same device multiple times, once for each nonce value (or until a match is identified).

In operation 825, data derived from the source address value is decrypted using the key information obtained in operation 820. For example, in some embodiments, operation 825 performs an inverse transformation operation on the source address value to reverse any operations performed by the wireless client device when conforming an encrypted nonce value to a device address format. For example, as discussed above, with respect to operation 715, a wireless client device converts from an encrypted nonce value to a device address value by performing one or more operations (shifting, truncation, hashing, and bit setting) on the nonce value. Thus, some embodiments of operation 825 perform essentially an inverse operation of any conversion operations of operation 715 before decrypting the resulting value.

Decision operation 830 evaluates whether the decrypted value (after any inverse operations discussed above) matches the nonce value associated with the device. If a match is identified, method 800 moves from decision operation 830 to operation 832, which updates the nonce value, in preparation for the next address rotation of the device.

Method 800 then moves to operation 833, which processes the received message based on device information associated with the device. For example, in some embodiments, address translation and/or routing of the network message is based on from which particular device the network message originated. As discussed above, some embodiments associate one or more network resources with a source address value when the source address value is linked to a particular wireless client device. For example, some wireless client devices attempt to maintain Internet Protocol (IP) based (e.g. layer 3) connections across address rotations. Thus, some embodiments of operation 833 remap an IP address from a previous device address to a source device address indicated in the message received via operation 810. In operation 834, the source address value decoded from the received network message is added to the list of known source addresses.

Returning to the discussion of decision operation 830, if a match is not identified, method 800 moves from decision operation 830 to decision operation 835. Decision operation 835 determines if additional devices with impending rotations need to be evaluated. In embodiments that support multiple independent nonce values per device, decision operation 835 also evaluates whether some nonce values have not yet been evaluated from the list of devices with impending rotations. If there is more evaluating to be performed, method 800 returns to operation 820. If no more evaluating is needed, method 800 moves to end operation 840.

Thus, method 800 is performed iteratively in at least some embodiments. In these iterative embodiments, a plurality of network messages are received (e.g. via multiple performances of operation 810), with each of the plurality of messages indicating a different corresponding source address value in a source address field of the respective message.

In some embodiments, method 800 performs an inverse transformation on the source address field value, to reverse any modifications made by a transmitting side to make the encrypted value conform to a device address format. Thus, for example, if a locally administered bit was added to the encrypted value by the transmitter, method 800 removes the locally administrated bit (e.g. some embodiments then decrypt a 47 bit value).

As iterative performance of method 800 processes a plurality of different source address values, a corresponding plurality of decryptions are also performed. In some embodiments, multiple decryptions are attempted on one or more of the source addresses. For example, if multiple devices have impending rotations, a network infrastructure component receiving an unknown source address value attempts, in some embodiments, to decrypt data derived from the source address value using multiple different keys associated with multiple devices having impending rotations as it searches to identify which device originated the message. This iterative decryption of a single source address results in a corresponding plurality of decrypted source addresses. Some of those decrypted source address values will not match their respective nonces, generally indicating the data message did not originate from that device (unless the device perhaps supports multiple independent nonce values, one of which may still result in a match). If one of the decryptions results in a value that matches a nonce associated with the device, the originating device has been found. This process repeats, in some embodiments, as additional network messages with previously unknown source addresses are received.

Note that as a match between a decrypted source address (based on a key) and respective nonce value is identified, the nonce associated with the key is updated, as generally, a nonce value is used to generate one device address at each wireless client device (unless the nonce value is reset or rolls over, for example). Thus, in multiple iterations of method 800, the executing device will receive a plurality of network messages, each of the network messages indicating a source address. Collectively then, as the wireless client device modifies its source address, the executing device receives a plurality of network messages indicating a plurality of corresponding source addresses. The executing device decrypts, using a decryption key associated with the wireless client device, data derived from each of the plurality of corresponding source addresses, and obtains, from these decryptions, a plurality of decrypted source addresses. Note that some plurality of network messages from the wireless client device include the same source address, but as the wireless client device rotates its device address, there exists a plurality of network messages, that may be non-contiguously generated by the wireless client device, that is received by the executing device, with each of the source addresses in that plurality being a unique source address.

Furthermore, as the executing device processes messages received from the wireless client device, the executing device is generating new nonce values so as to provide for verification of new device addresses that identify the wireless client device as the device address rotates. This set of new nonce values begins from a first nonce value, and then collectively represent a plurality of subsequent nonce values, each of which is based, originally, on the first nonce value.

Figure 9:
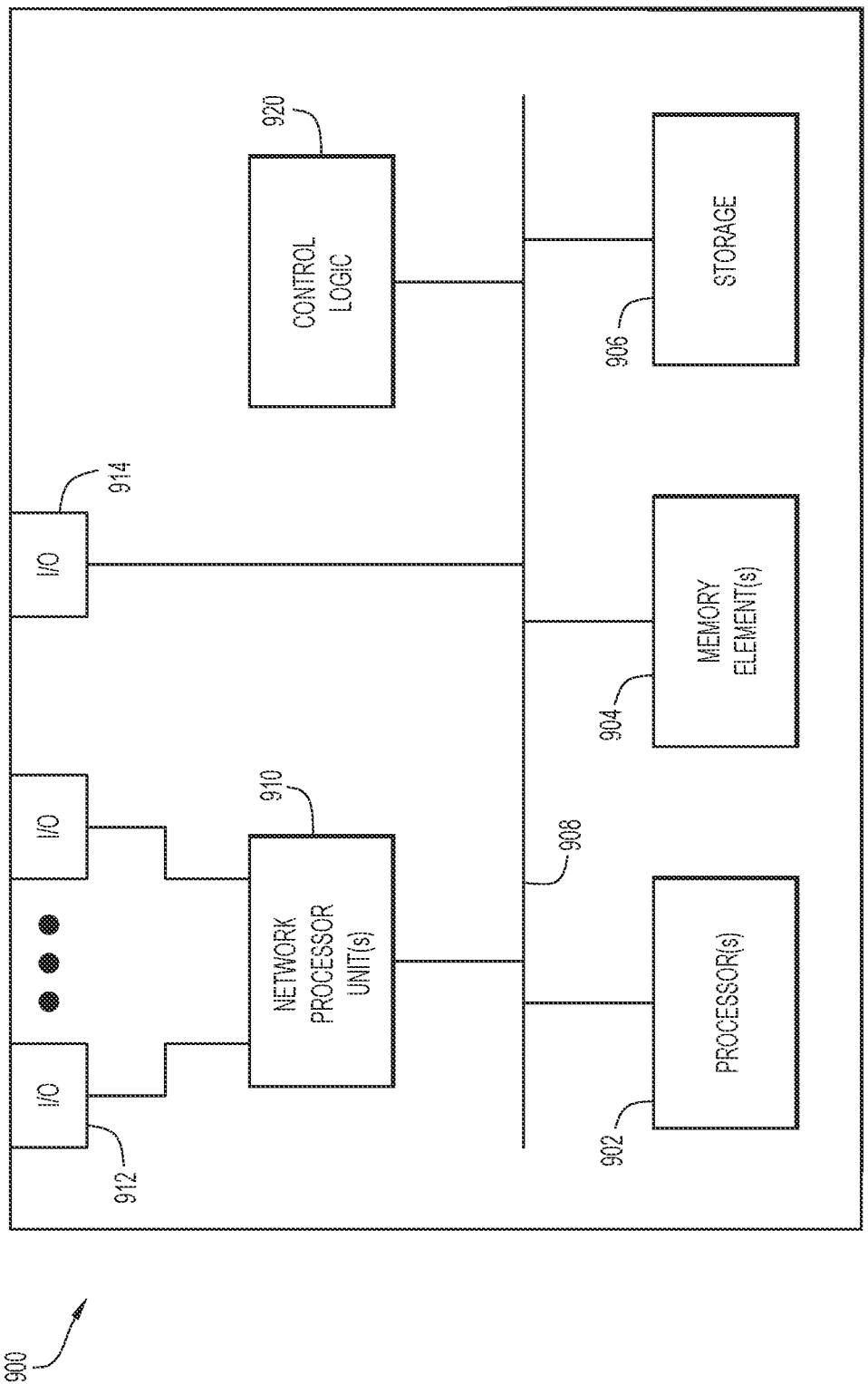
FIG. 9 is a hardware block diagram of a device that may perform functions associated with operations discussed herein in connection with the techniques depicted in any one or more of FIGS. 1-8.

FIG. 9 is a hardware block diagram of a device 900 that may perform functions associated with operations discussed herein in connection with the techniques depicted in any one or more of FIGS. 1-8. In various embodiments, any of the devices described above (e.g., an AP, a wireless network controller, an AAA server, a DHCP server, an ARP server) implement, in some embodiments, a computing architecture analogous to that described below with respect to the device 900.

In at least one embodiment, the device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for device 900 can overlap in any manner and are not limited to the specific allocation of instructions and/or operations described herein.

In at least one embodiment, processor(s) 902 is/are at least one hardware processor configured to execute various tasks, operations and/or functions for device 900 as described herein according to software and/or instructions configured for device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with device 900, and/or logic configured for memory element(s) 904 and/or storage 906. For example, any logic described herein (e.g., control logic 920) can, in various embodiments, be stored for device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of device 900 to communicate in order to exchange information and/or data. Bus 908 can be implemented with any architecture designed for passing control, data and/or information between processors, memory elements/storage, peripheral devices, and/or any other hardware and/or software components that may be configured for device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between device 900 and other systems, devices, or entities, via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 900 and other systems, devices, or entities to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to device 900. For example, I/O interface(s) 914 may provide a connection to external devices such as a keyboard, keypad, a touch screen, and/or any other suitable input and/or output device now known or hereafter developed. This may be the case, in particular, when the device 900 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 900 serves as a user device as described herein.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), Institute of Electrical and Electronics Engineers (IEEE) 802.11, Wi-Fi®/Wi-Fi6®, IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided that comprises establishing a secure communication channel with a wireless client device, receiving, via the secure communication channel, a decryption key and a first nonce value from the wireless client device, receiving a first network message indicating a source address, decrypting, using the decryption key, a value derived from the source address to obtain a decrypted source address, comparing the decrypted source address to the first nonce value; and determining the first network message originated from the wireless client device based on the comparing.

In another form, an apparatus is provided that comprises a network interface configured to enable network communications, one or more processors, and one or more memories storing instructions that when executed configure the one or more processors to perform operations comprising establishing a secure communication channel with a wireless client device, receiving, via the secure communication channel, a decryption key and a first nonce value from the wireless client device, receiving a first network message indicating a source address, decrypting, using the decryption key, a value derived from the source address to obtain a decrypted source address, comparing the decrypted source address to the first nonce value; and determining the first network message originated from the wireless client device based on the comparing.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   exchanging, with a wireless client device over a secure communication channel, key information, a first nonce value, and a second nonce value;
   receiving, from the wireless client device, a first rotation imminent message indicating that address rotation by the wireless client device is to occur within a time period from reception of the first rotation imminent message, the first rotation imminent message comprising a known source address of the wireless client device and the first nonce value;
   following the first rotation imminent message, receiving a first data message comprising a first source address;
   decrypting, based on the key information, a first encrypted value that is derived from the first source address to obtain a first decrypted value;
   comparing the first decrypted value with the first nonce value; and
   identifying that the first data message indicating the first source address originated from the wireless client device based on the comparing.

2. The method of claim 1, further comprising:
   storing information of the wireless client device within a list associated with wireless client devices having an impending address rotation.

3. The method of claim 1, further comprising:
   receiving, from the wireless client device, a second rotation imminent message comprising the first source address and the second nonce value;
   receiving a second data message comprising a second source address;
   decrypting, based on the key information, a second encrypted value that is derived from the second source address to obtain a second decrypted value;
   comparing the second decrypted value with the second nonce value; and
   identifying that the second data message indicating the second source address originated from the wireless client device based on the comparing.

4. The method of claim 1, further comprising:
   obtaining, from the wireless client device, a maintenance message comprising the first source address of the wireless client device and a new second nonce value.

5. The method of claim 4, further comprising:
   decrypting, based on the key information, a third encrypted value that is derived from the first source address to obtain a third decrypted value;
   comparing the third decrypted value with the first nonce value; and
   identifying that the maintenance message originated from the wireless client device based on the comparing.

6. The method of claim 5, wherein the maintenance message comprises a function field identifying that a reset operation is to be performed, a first parameter field identifying the second nonce value, and a second parameter field identifying the new second nonce value, wherein the maintenance message causes the second nonce value of the wireless client device to be updated to the new second nonce value.

7. The method of claim 5, further comprising:
   receiving, from the wireless client device, a third rotation imminent message comprising the first source address and the new second nonce value;
   receiving a third data message indicating a third source address;
   decrypting, based on the key information, a third encrypted value that is derived from the third source address to obtain a third decrypted value;
   comparing the third decrypted value with the new second nonce value; and
   identifying that the third data message indicating the third source address originated from the wireless client device based on the comparing.

8. An apparatus comprising:
   a network interface configured to enable network communications;
   one or more processors; and
   one or more memories storing instructions that when executed configure the one or more processors to perform operations comprising:
      exchanging, with a wireless client device over a secure communication channel, key information, a first nonce value, and a second nonce value;
      receiving, from the wireless client device, a first rotation imminent message indicating that address rotation by the wireless client device is to occur within a time period from reception of the first rotation imminent message, the first rotation imminent message comprising a known source address of the wireless client device and the first nonce value;
      following the first rotation imminent message, receiving a first data message comprising a first source address;
      decrypting, based on the key information, a first encrypted value that is derived from the first source address to obtain a first decrypted value;
      comparing the first decrypted value with the first nonce value; and
      identifying that the first data message indicating the first source address originated from the wireless client device based on the comparing.

9. The apparatus of claim 8, the operations further comprising:
   receiving, from the wireless client device, a second rotation imminent message comprising the first source address and the second nonce value;
   receiving a second data message comprising a second source address;
   decrypting, based on the key information, a second encrypted value that is derived from the second source address to obtain a second decrypted value;
   comparing the second decrypted value with the second nonce value; and
   identifying that the second data message indicating the second source address originated from the wireless client device based on the comparing.

10. The apparatus of claim 8, the operations further comprising:
obtaining, from the wireless client device, a maintenance message comprising the first source address of the wireless client device and a new second nonce value.

11. The apparatus of claim 10, the operations further comprising:
decrypting, based on the key information, a third encrypted value that is derived from the first source address to obtain a third decrypted value;
comparing the third decrypted value with the first nonce value; and
identifying that the maintenance message originated from the wireless client device based on the comparing.

12. The apparatus of claim 11, wherein the maintenance message comprises a function field identifying that a reset operation is to be performed, a first parameter field identifying the second nonce value, and a second parameter field identifying the new second nonce value, wherein the maintenance message causes the second nonce value of the wireless client device to be updated to the new second nonce value.

13. The apparatus of claim 11, the operations further comprising:
receiving, from the wireless client device, a third rotation imminent message comprising the first source address and the new second nonce value;
receiving a third data message indicating a third source address;
decrypting, based on the key information, a third encrypted value that is derived from the third source address to obtain a third decrypted value;
comparing the third decrypted value with the new second nonce value; and
identifying that the third data message indicating the third source address originated from the wireless client device based on the comparing.

14. A non-transitory computer readable storage medium comprising instructions that, when executed by a processor, cause the processor to perform operations, comprising:
exchanging, with a wireless client device over a secure communication channel, key information, a first nonce value, and a second nonce value;
receiving, from the wireless client device, a first rotation imminent message indicating that address rotation by the wireless client device is to occur within a time period from reception of the first rotation imminent message, the first rotation imminent message comprising a known source address of the wireless client device and the first nonce value;
following the first rotation imminent message, receiving a first data message comprising a first source address;
decrypting, based on the key information, a first encrypted value that is derived from the first source address to obtain a first decrypted value;
comparing the first decrypted value with the first nonce value; and
identifying that the first data message indicating the first source address originated from the wireless client device based on the comparing.

15. The non-transitory computer readable storage medium of claim 14, further comprising instructions that when executed by the processor, cause the processor to perform further operations, comprising:
storing information of the wireless client device within a list associated with wireless client devices having an impending address rotation.

16. The non-transitory computer readable storage medium of claim 14, further comprising instructions that when executed by the processor, cause the processor to perform further operations, comprising:
receiving, from the wireless client device, a second rotation imminent message comprising the first source address and the second nonce value;
receiving a second data message comprising a second source address;
decrypting, based on the key information, a second encrypted value that is derived from the second source address to obtain a second decrypted value;
comparing the second decrypted value with the second nonce value; and
identifying that the second data message indicating the second source address originated from the wireless client device based on the comparing.

17. The non-transitory computer readable storage medium of claim 14, further comprising instructions that when executed by the processor, cause the processor to perform further operations, comprising:
obtaining, from the wireless client device, a maintenance message comprising the first source address of the wireless client device and a new second nonce value.

18. The non-transitory computer readable storage medium of claim 17, further comprising instructions that when executed by the processor, cause the processor to perform further operations, comprising:
decrypting, based on the key information, a third encrypted value that is derived from the first source address to obtain a third decrypted value;
comparing the third decrypted value with the first nonce value; and
identifying that the maintenance message originated from the wireless client device based on the comparing.

19. The non-transitory computer readable storage medium of claim 18, wherein the maintenance message comprises a function field identifying that a reset operation is to be performed, a first parameter field identifying the second nonce value, and a second parameter field identifying the new second nonce value, wherein the maintenance message causes the second nonce value of the wireless client device to be updated to the new second nonce value.

20. The non-transitory computer readable storage medium of claim 18, further comprising instructions that when executed by the processor, cause the processor to perform further operations, comprising:
receiving, from the wireless client device, a third rotation imminent message comprising the first source address and the new second nonce value;
receiving a third data message indicating a third source address;
decrypting, based on the key information, a third encrypted value that is derived from the third source address to obtain a third decrypted value;
comparing the third decrypted value with the new second nonce value; and
identifying that the third data message indicating the third source address originated from the wireless client device based on the comparing.

* * * * *